(12) United States Patent
Phelps et al.

(10) Patent No.: US 7,835,967 B2
(45) Date of Patent: Nov. 16, 2010

(54) METHODS AND SYSTEMS FOR PROVIDING BOOK ACCOUNTING INDICES

(75) Inventors: Bruce D. Phelps, Darien, CT (US); Lev Dynkin, Great Neck, NY (US); Jordan I. Mann, Lawrence, NY (US); Yang Chen, Edgewater, NJ (US)

(73) Assignee: Barclays Capital, Inc., New York, NY (US)

( * ) Notice: Subject to any disclaimer, the term of this patent is extended or adjusted under 35 U.S.C. 154(b) by 531 days.

(21) Appl. No.: 11/541,146

(22) Filed: Sep. 28, 2006

(65) Prior Publication Data

US 2007/0192228 A1 Aug. 16, 2007

Related U.S. Application Data

(60) Provisional application No. 60/721,786, filed on Sep. 28, 2005.

(51) Int. Cl.
*G06Q 40/00* (2006.01)

(52) U.S. Cl. ...................... 705/36 R; 705/37

(58) Field of Classification Search .............. 705/35–37
See application file for complete search history.

(56) References Cited

U.S. PATENT DOCUMENTS

| | | | | |
|---|---|---|---|---|
| 2003/0212621 | A1* | 11/2003 | Poulter et al. | 705/36 |
| 2005/0192885 | A1* | 9/2005 | Horowitz | 705/36 |
| 2006/0069635 | A1* | 3/2006 | Ram et al. | 705/37 |

* cited by examiner

*Primary Examiner*—Thu Thao Havan
(74) *Attorney, Agent, or Firm*—Morgan, Lewis & Bockius LLP

(57) ABSTRACT

In at least one aspect, the invention comprises a method comprising the steps of: identifying a first portfolio of securities as corresponding, at a specified time, to an index; calculating, for the first portfolio, a first set of performance values comprising one or more of: book yield, book income, and book return; calculating, for a second portfolio of securities, a second set of performance values corresponding to the first set of performance values; and comparing the second set of performance values to the first set of performance values to obtain a performance measure for the second portfolio.

24 Claims, 48 Drawing Sheets

| PERFORMANCE MEASURE | BOOK MANAGER | TOTAL RETURN MANAGER (WITH T/O) |
|---|---|---|
| PORTFOLIO BOOK VALUE 31 DECEMBER 2004 | $196,474,232 | $213,921,482 |
| PORTFOLIO MARKET VALUE 31 DECEMBER 2004 | $212,686,829 | $217,898,351 |
| BOOK YIELD (DECEMBER 2004) | 5.59% | 4.40% |
| AVERAGE MONTHLY MARKET TOTAL RETURN (JAN 95–DEC 04) | 63.8 bp | 65.7 bp (W/ALPHA) |
| STANDARD DEVIATION OF MONTHLY MARKET TOTAL RETURN | 108.3 bp | 111.4 bp (W/ALPHA) |
| "RISK ADJUSTED" MEAN/STD DEV | 0.59 | 0.59 (W/ALPHA) |
| AVERAGE MONTHLY MARKET TOTAL RETURN (JAN 95–DEC 04) | | 62.6 bp (W/O ALPHA) |
| STANDARD DEVIATION OF MONTHLY MARKET TOTAL RETURN | | 109.9 bp (W/O ALPHA) |
| "RISK ADJUSTED" MEAN/STD DEV | | 0.57 (W/O ALPHA) |
| AVERAGE MONTHLY BOOK RETURN (JAN 95–DEC 04) | 58.8 bp | 54.9 bp (W/ALPHA) |
| STANDARD DEVIATION OF MONTHLY BOOK RETURN | 7.5 bp | 19.9 bp (W/ALPHA) |
| AVERAGE MONTHLY BOOK RETURN (JAN 95–DEC 04) | | 51.8 bp (W/O ALPHA) |
| STANDARD DEVIATION OF MONTHLY BOOK RETURN | | 9.1 bp (W/O ALPHA) |
| AVERAGE MONTHLY BOOK INCOME (JAN 95–DEC 04) | $834,030 | $812,961 (W/ALPHA) |
| STANDARD DEVIATION OF MONTHLY BOOK INCOME | $95,478 | $276,134 (W/ALPHA) |
| AVERAGE MONTHLY BOOK INCOME (JAN 95–DEC 04) | | $751,071 (W/O ALPHA) |
| STANDARD DEVIATION OF MONTHLY BOOK INCOME | | $75,849 (W/O ALPHA) |

MARKET VALUE PERFORMANCE

BOOK RETURN VERSUS MARKET RETURN: A PORTFOLIO OF THE LEHMAN BROTHERS U.S. TREASURY INDEX, PURCHASED ON DECEMBER 31, 1999

JANUARY 2000 VINTAGE BOOKIN CHANGING COMPOSITION OVER TIME

MONTHLY BOOK YIELDS

FIG.3(a)

PERFORMANCE MONTH

| VINTAGE MONTH | 11/30/ 2003 | 12/31/ 2003 | 1/21/ 2004 | 2/29/ 2004 | 3/31/ 2004 | 4/30/ 2004 | 5/31/ 2004 | 6/30/ 2004 | 7/31/ 2004 | 8/31/ 2004 | 9/30/ 2004 | 10/31/ 2004 |
|---|---|---|---|---|---|---|---|---|---|---|---|---|
| 11/30/ 2003 | 4.37004 4005 | 4.318610 661 | 4.29694 4711 | 4.27096 8794 | 4.24620 491 | 4.2909 4792 | 4.29453 077 | 4.28578 4278 | 4.27146 949 | 4.24454 397 | 4.2400 2075 | 4.22366 624 |
| 12/31/ 2003 | | 4.207532 563 | 4.15949 7714 | 4.13278 0371 | 4.10752 581 | 4.1611 3476 | 4.16681 183 | 4.15973 9072 | 4.14535 032 | 4.11645 157 | 4.1130 4431 | 4.09594 528 |
| 1/21/ 2004 | | | 4.12635 3304 | 4.06997 2561 | 4.04441 342 | 4.1014 1348 | 4.10776 012 | 4.10164 5575 | 4.08760 931 | 4.05768 757 | 4.0546 6248 | 4.03695 248 |
| 2/29/ 2004 | | | | 3.95376 5 | 3.90407 021 | 3.9669 8336 | 3.97400 29 | 3.96848 8263 | 3.95415 725 | 3.92316 131 | 3.9209 6077 | 3.90257 306 |
| 3/31/ 2004 | | | | | 3.86632 485 | 3.8983 9901 | 3.90424 662 | 3.89928 5994 | 3.88465 709 | 3.85398 801 | 3.8517 4619 | 3.83313 406 |
| 4/30/ 2004 | | | | | | 4.5038 1171 | 4.48204 02 | 4.46975 1657 | 4.45221 723 | 4.42448 699 | 4.4178 7157 | 4.40028 586 |
| 5/31/ 2004 | | | | | | | 4.69084 038 | 4.65427 1736 | 4.63613 891 | 4.60946 211 | 4.6013 2648 | 4.58510 184 |
| 6/30/ 2004 | | | | | | | | 4.67617 0972 | 4.63290 925 | 4.60382 947 | 4.5958 9108 | 4.57847 513 |
| 7/31/ 2004 | | | | | | | | | 4.56626 939 | 4.51097 159 | 4.5038 4914 | 4.48551 865 |
| 8/31/ 2004 | | | | | | | | | | 4.26149 473 | 4.2267 4374 | 4.20600 058 |
| 9/30/ 2004 | | | | | | | | | | | 4.3161 2211 | 4.26654 769 |
| 10/31/ 2004 | | | | | | | | | | | | 4.21569 493 |

PERFORMANCE MONTH

| VINTAGE MONTH | 12/31/ 2003 | 1/21/ 2004 | 2/29/ 2004 | 3/31/ 2004 | 4/30/ 2004 | 5/31/ 2004 | 6/30/ 2004 | 7/31/ 2004 | 8/31/ 2004 | 9/30/ 2004 | 10/31/ 2004 | 11/30/ 2004 |
|---|---|---|---|---|---|---|---|---|---|---|---|---|
| 11/30/ 2003 | 0.2253 04347 | 0.2096 1211 | 0.2041 8347 | 0.0966 6954 | 0.2028 1589 | 0.1917 269 | 0.2769 17932 | 0.2128 01932 | 0.1660 65871 | 0.2925 59937 | 0.2085 33461 | 0.2055 36188 |
| 12/31/ 2003 | | 0.1940 9897 | 0.1971 6738 | 0.0728 5964 | 0.1868 211 | 0.1836 7019 | 0.2697 77086 | 0.1988 9023 | 0.1579 58244 | 0.2828 3181 | 0.2039 02955 | 0.2103 87933 |
| 1/21/ 2004 | | | 0.1940 5792 | 0.0753 1407 | 0.1779 6094 | 0.1703 8522 | 0.2667 87964 | 0.1952 09561 | 0.1577 18968 | 0.2717 69109 | 0.2014 4371 | 0.2145 36667 |
| 2/29/ 2004 | | | | 0.0695 3913 | 0.1654 6495 | 0.1630 147 | 0.2544 34457 | 0.1910 87881 | 0.1493 04272 | 0.2591 2732 | 0.1931 31584 | 0.2052 02862 |
| 3/31/ 2004 | | | | | 0.1560 4755 | 0.1701 6769 | 0.2525 12561 | 0.1982 38219 | 0.1496 75508 | 0.2588 78606 | 0.1922 07517 | 0.2007 70436 |
| 4/30/ 2004 | | | | | | 0.2143 4133 | 0.2998 39301 | 0.2573 63165 | 0.2081 77659 | 0.3074 82735 | 0.2472 1168 | 0.2395 90511 |
| 5/31/ 2004 | | | | | | | 0.3166 25889 | 0.2793 39707 | 0.2254 56218 | 0.3152 40558 | 0.2651 98673 | 0.2598 845 |
| 6/30/ 2004 | | | | | | | | 0.2981 39686 | 0.2327 85615 | 0.3155 71291 | 0.2682 47914 | 0.2707 0098 |
| 7/31/ 2004 | | | | | | | | | 0.2302 69494 | 0.3087 30522 | 0.2623 75689 | 0.2638 10007 |
| 8/31/ 2004 | | | | | | | | | | 0.2870 63085 | 0.2418 11016 | 0.2436 28858 |
| 9/30/ 2004 | | | | | | | | | | | 0.2495 21613 | 0.2488 74683 |
| 10/31/ 2004 | | | | | | | | | | | | 0.2482 38948 |

MONTHLY BOOK RETURNS

FIG.3(b)

CUSTOM BOOKIN BUILDER

CUSTOM BOOKIN BUILDER

UNDERLYING INDEX:
LEHMAN BROTHERS US AGGREGATE INDEX

| BOOK INCOME | PRE-TAX BOOK YIELD | REALIZED BOOK GAIN/LOSS | AMORTIZATION | BOOK RETURN | MARKET VALUE |
|---|---|---|---|---|---|
| $ — | | | | — | |
| $ 285,433 | 5.56% | $ — | $ — | 0.477 | $ 60,515,562 |
| $ 263,470 | 5.45% | $ 422 | $ — | 0.434 | $ 61,590,823 |
| $ 198,564 | 5.42% | $ (4,478) | $ — | 0.316 | $ 64,038,131 |
| $ 311,098 | 5.30% | $ (59,920) | $ — | 0.405 | $ 78,791,642 |
| $ 409,469 | 4.99% | $ (11,812) | $ — | 0.381 | $ 134,092,815 |
| $ 467,517 | 4.86% | $ (17,522) | $ — | 0.357 | $ 136,155,054 |
| $ 577,922 | 4.80% | $ (45,493) | $ — | 0.383 | $ 155,522,744 |
| $ 521,533 | 4.81% | $ (17,975) | $ — | 0.329 | $ 161,996,954 |
| $ 651,618 | 4.64% | $ (83,712) | $ — | 0.395 | $ 171,760,140 |
| $ 574,070 | 4.62% | $ 17,290 | $ — | 0.324 | $ 183,907,377 |
| $ 676,174 | 4.50% | $ (86,939) | $ — | 0.374 | $ 188,880,106 |
| $ 622,529 | 4.50% | $ 3,198 | $ — | 0.344 | $ 188,702,854 |
| $ 353,034 | 4.43% | $ 387,753 | $ — | 0.206 | $ 179,726,199 |
| $ 722,108 | 4.22% | $ (219,990) | $ — | 0.420 | $ 182,921,168 |
| $ 1,050,021 | 4.24% | $ 127,457 | $ — | 0.565 | $ 196,230,698 |
| $ 629,252 | 4.45% | $ 362,118 | $ — | 0.335 | $ 191,061,179 |
| | 4.43% | $ (54,683) | $ — | | $ 192,289,313 |

FIG.4B

| | | | | |
|---|---|---|---|---|
| 9/30/2003 | $ 85,979 | $0 | MAX LOSS, NO G/L TARGET | $ 189,264,310 | $ 5,887,269 |
| 10/31/2003 | $ 28,877,420 | $0 | MAX LOSS, NO G/L TARGET | $ 218,359,004 | $ 4,481,601 |
| 11/30/2003 | $ 11,644,074 | $0 | MAX GAIN, NO G/L TARGET | $ 230,997,308 | $ 5,727,478 |
| 12/31/2003 | $ 5,000,000 | $0 | MAX GAIN, NO G/L TARGET | $ 236,275,834 | $ 3,760,422 |
| 1/31/2004 | $ 13,500,000 | $0 | MAX LOSS, NO G/L TARGET | $ 250,362,754 | $ 4,755,143 |
| 2/29/2004 | $ 3,021,185 | $0 | MAX LOSS, NO G/L TARGET | $ 254,599,783 | $ 5,886,771 |
| 3/31/2004 | $ 5,019,350 | $0 | MAX LOSS, NO G/L TARGET | $ 260,184,303 | $ 4,842,578 |
| 4/30/2004 | $ 272,972 | $0 | MAX GAIN, NO G/L TARGET | $ 261,240,892 | $ 5,820,707 |
| 5/31/2004 | $ 1,058,652 | $0 | MAX GAIN, NO G/L TARGET | $ 263,712,338 | $ 7,368,945 |
| 6/30/2004 | $ 15,541 | $0 | MAX GAIN, NO G/L TARGET | $ 264,139,239 | $ 5,045,175 |
| 7/31/2004 | $ — | $0 | MAX LOSS, NO G/L TARGET | $ 264,970,497 | $ 5,865,302 |
| 8/31/2004 | $ (5,000,000) | $0 | PRO-RATA, NO G/L TARGET | $ 251,298,382 | $ 6,079,371 |
| 9/30/2004 | $ 13,000,054 | $0 | MAX LOSS, NO G/L TARGET | $ 274,887,825 | $ 4,141,225 |
| 10/31/2004 | $ 20,000,000 | $0 | MAX LOSS, NO G/L TARGET | $ 295,234,710 | $ 3,873,663 |
| 11/30/2004 | $ 9,670,882 | $0 | MAX LOSS, NO G/L TARGET | $ 306,391,208 | $ 6,675,811 |
| 12/31/2004 | $ — | $0 | MAX LOSS, NO G/L TARGET | $ 301,400,716 | $ 4,067,808 |

FIG.4C

| | | | | |
|---|---|---|---|---|
| $ 470,664 | 4.32% | $ (205,219) | 0.249 | $ 197,012,374 |
| $ 753,823 | 4.34% | $ 74,374 | 0.398 | $ 224,176,546 |
| $ 780,523 | 4.35% | $ (362) | 0.357 | $ 236,408,108 |
| $ 761,525 | 4.32% | $ (59,216) | 0.330 | $ 243,562,135 |
| $ 784,862 | 4.30% | $ (49,604) | 0.332 | $ 258,945,448 |
| $ 827,511 | 4.28% | $ (54,171) | 0.331 | $ 264,599,876 |
| $ 843,188 | 4.26% | $ (50,618) | 0.331 | $ 271,534,885 |
| $ 1,113,215 | 4.32% | $ 193,783 | 0.426 | $ 265,144,728 |
| $ 982,599 | 4.35% | $ 53,179 | 0.376 | $ 265,193,796 |
| $ 879,951 | 4.35% | $ (59,455) | 0.334 | $ 266,502,104 |
| $ 873,598 | 4.35% | $ (65,899) | 0.331 | $ 269,031,321 |
| $ 795,180 | 4.34% | $ (142,736) | 0.300 | $ 268,955,885 |
| $ 922,538 | 4.34% | $ (12,353) | 0.353 | $ 282,809,444 |
| $ 905,395 | 4.32% | $ (76,219) | 0.329 | $ 305,046,511 |
| $ 1,114,235 | 4.36% | $ 62,215 | 0.377 | $ 312,254,126 |
| $ 1,020,706 | 4.35% | $ (70,233) | 0.333 | $ 309,665,027 |

FIG.4D

|  | MANAGER | BOOKIN BENCHMARK | LEH CREDIT INDEX |
|---|---|---|---|
| DECEMBER 31, 2003 | | | |
| BOOK YIELD [1] | 4.48% | 4.32% | 4.32% |
| BOOK VALUE | $2,110,723,000 | $2,105,059,186 | |
| CUMULATIVE BOOK INCOME [2] | $0 | $0 | |
| OAD [3] | 5.97 | 5.78 | |
| EXPECTED SHORTFALL (1%) | 14.2% | 10.2% | |
| DECEMBER 31, 2004 | | | |
| BOOK YIELD | 4.51% | 4.42% | 4.58% |
| BOOK VALUE | $3,251,719,000 | $3,247,537,699 | |
| CUMULATIVE BOOK INCOME | $85,016,000 | $88,828,082 | |
| MARCH 31, 2005 | | | |
| BOOK YIELD | 4.52% | 4.48% | 5.14% |
| BOOK VALUE | $3,283,428,000 | $3,288,578,870 | |
| CUMULATIVE BOOK INCOME | $121,637,000 | $123,857,381 | |
| EXPECTED SHORTFALL (1%) | 11.4% | | |

[1] CALCULATED USING BOOK VALUE WEIGHTS
[2] CUMULATIVE BOOK INCOME EQUALS THE SUM OF MONTLY BOOK INCOME TO DATE. BOOK INCOME INCLUDES ANY GAIN OR LOSS ARISING FROM ANY BONDS SOLD OUT OF THE INDEX IF THEY FAIL TO SATISFY INDEX INCLUSION RULES (E.G., DUE TO DOWNGRADE). WE ASSUME THE MANAGER CHOOSES NOT TO SELL ANY DOWNGRADED BONDS.
[3] CALCULATED USING MARKET VALUE WEIGHTS.

COMPARISON OF MANAGER AND BOOKIN BENCHMARK

FIG.5

| PARAMETER | MANAGER'S PORTFOLIO | BOOKIN BENCHMARK | DIFFERENCE |
|---|---|---|---|
| POSITIONS | 33 | 3482 | |
| ISSUERS | 27 | 673 | |
| MARKET VALUE | $2,136,938 | $2,149,935,298 | |
| YIELD TO WORST | 4.48% | 4.34% | 0.14 |
| OAS | 105 bp | 89 bp | 16 |
| OAD | 5.97 | 5.78 | 0.2 |
| OA SPREAD DURATION | 5.81 | 5.64 | 0.17 |
| TOTAL VOL (bps/mo) | 154.0 | 144.5 | |
| SYSTEMATIC VOL (bps/mo) | 148.6 | 143.4 | |
| NON-SYST. VOL (bps/mo) | 33.9 | 9.6 | |
| DEFAULT VOL (bps/mo) | 23.9 | 15.3 | |

PORTFOLIO – BOOKIN BENCHMARK COMPARISON, DECEMBER 31, 2003

FIG.6

| | MANAGER | | | BOOKIN BENCHMARK | | |
|---|---|---|---|---|---|---|
| | MV[%] | OAD | YIELD | MV[%] | OAD | YIELD |
| TOTAL | 100.0 | 6.0 | 4.5% | 100.0 | 5.8 | 4.3% |
| Aaa | 13.6 | 3.3 | 2.9 | 10.4 | 4.4 | 3.2 |
| Aa | 5.9 | 2.2 | 2.4 | 8.6 | 5.2 | 3.5 |
| A | 33.2 | 6.1 | 4.0 | 38.1 | 5.8 | 4.1 |
| Baa | 44.3 | 7.4 | 5.6 | 42.8 | 6.3 | 4.9 |
| Ba | 2.9 | 2.7 | 4.2 | | | |

MARKET STRUCTURE: PORTFOLIO VERSUS BOOKIN BENCHMARK

FIG. 7

| CREDIT 1-G SPREAD | PORTFOLIO EXPOSURE (OASD) | BOOKIN BENCHMARK EXPOSURE (OASD) | NET EXPOSURE | FACTOR VOLATILITY | TE IMPACT OF AN ISOLATED 1 STD. DEV. UP CHANGE (BPS) | PERCENTAGE OF TRACKING ERROR VARIANCE (%) |
|---|---|---|---|---|---|---|
| BANKING A | 1.03 | 0.74 | 0.29 | 9.51 | -2.76 | 2.53 |
| BASIC INDUSTRY A | 0.00 | 0.18 | -0.18 | 7.64 | 1.35 | -0.85 |
| BASIC INDUSTRY BAA | 0.10 | 0.27 | -0.17 | 10.12 | 1.76 | -1.46 |
| CYCLICAL BAA | 1.04 | 0.55 | 0.49 | 22.29 | -10.97 | 12.67 |
| COMMUNICATION A | 0.73 | 0.31 | 0.42 | 9.64 | -4.02 | 3.87 |
| COMMUNICATION BAA | 0.89 | 0.48 | 0.41 | 16.44 | -6.76 | 7.67 |
| ENERGY BAA | 0.00 | 0.33 | -0.33 | 10.42 | 3.43 | -2.67 |
| FINANCIAL AAA/AA | 0.29 | 0.15 | 0.14 | 7.80 | -1.11 | 0.89 |
| FINANCIAL A | 0.18 | 0.26 | -0.07 | 10.60 | 0.76 | -0.68 |
| FINANCIAL BAA | 0.00 | 0.15 | -0.15 | 13.34 | 1.96 | -1.21 |
| NON-CYCLICAL A | 0.00 | 0.22 | -0.22 | 7.10 | 1.59 | -0.87 |
| NON-CYCLICAL BAA | 0.13 | 0.20 | -0.07 | 9.28 | 0.65 | -0.43 |
| NON-CORPORATE AAA/AA | 0.22 | 0.45 | -0.23 | 5.66 | 1.31 | -0.39 |
| NON-CORPORATE A | 0.00 | 0.13 | -0.13 | 8.22 | 1.06 | -0.82 |
| UTILITY A | 0.05 | 0.12 | -0.08 | 8.38 | 0.65 | -0.49 |
| UTILITY BAA | 0.41 | 0.34 | 0.07 | 15.20 | -1.10 | 1.05 |
| CORPORATE SPREAD SLOPE | 47.27 | 42.13 | 5.14 | 0.22 | -1.14 | -0.29 |
| CORPORATE LIQUIDITY | 1.38 | 0.79 | 0.59 | 7.66 | -4.49 | 5.2 |
| FOREIGN CORPORATES A | 0.00 | 0.37 | -0.37 | 4.37 | 1.63 | 0.92 |
| FOREIGN CORPORATES BAA | 0.00 | 0.36 | -0.36 | 6.02 | 2.14 | 0.8 |

FIG.8A

| | | | | |
|---|---|---|---|---|
| CREDIT H-Y SPREAD | 0.08 | 0.00 | 0.08 | |
| HIGH-YIELD UTILITY | -0.36 | 0.00 | -0.36 | |
| HIGH-YIELD SPREAD SLOPE | -0.07 | 0.00 | -0.07 | |
| HIGH-YIELD LIQUIDITY | | | 78.04 | 6.56 |
| EMERGING MKT SPREAD | | | 0.54 | 0.15 |
| | | | 8.04 | -0.48 |
| EMG INVESTMENT GRADE | 0.61 | 0.17 | 0.43 | |
| EMG NON-DISTRESSED SLOPE | 4.44 | 1.30 | 3.14 | |
| | | | 39.49 | 22.11 |
| | | | 1.50 | -2.94 |
| EMG NON-DISTRESSED LIQUIDITY | 0.19 | 0.04 | 0.15 | |
| | | | 14.83 | 2.48 |

PORTFOLIO - BOOKIN TRACKING ERROR (EXCERPTS), DECEMBER 31, 2003

FIG.8B

| TICKER | NAME | SECTOR | RATING | # ISSUES | PORTFOLIO WEIGHT |
|---|---|---|---|---|---|
| F | FORD CAPITAL | TRANSPORTATION | BAA3 BAA2 | 2 | 9.1% |
| GM | GMAC | AUTOMOTIVE | BAA2 | 2 | 9.0 |
| GE | GENERAL ELECTRIC | MULTIPLE | AAA A3 | 2 | 6.8 |
| VZ | CHESAPEAK + POTOMAC | WIRELINES | A1 A3 A2 BAA1 | 2 | 6.3 |
| C | ASSOCIATES CORP | NON-CAPTIVE CONSUMER | AA3 A1 A2 A3 | 2 | 5.8 |
| MEX | UMS | SOVEREIGNS | BAA3 | 1 | 4.7 |
| NI | COLUMBIA ENERGY | ELECTRIC | BAA2 BAA3 | 2 | 4.0 |
| KFW | KFW | FOREIGN AGENCIES | AAA | 1 | 3.8 |
| T | AT&T CORP | WIRELINES | BAA2 | 1 | 3.3 |
| WFC | NORWEST CORP | NON-CAPTIVE CONSUMER | AA3 A1 A2 | 1 | 3.2 |
| PEMEX | PEMEX | SOVEREIGNS | BAA3 BAA1 AAA | 1 | 3.2 |
| IBRD | IBRD | SUPRANATIONALS | AAA | 1 | 3.0 |

CREDIT TICKERS REPORT (EXCERPTS)

FIG.9

| RISK FACTOR | ISOLATED TEV | CUMULATIVE TEV | PERCENTAGE OF TRACKING ERROR VARIANCE |
|---|---|---|---|
| YIELD CURVE | 4.6 bp | 4.6 bp | 1.8% |
| SWAP SPREADS | 3.0 | 5.3 | 0.6 |
| VOLATILITY | 0.5 | 5.4 | -0.1 |
| INVESTMENT-GRADE SPREADS | 16.5 | 17.6 | 21.4 |
| HIGH YIELD SPREADS | 6.0 | 20.8 | 6.2 |
| EMERGING MARKET SPREAD | 16.6 | 31.1 | 21.7 |
| SYSTEMATIC RISK | 31.1 | 31.1 | 51.7 |
| IDIOSYNCRATIC RISK | 27.1 | 41.2 | 39.4 |
| CREDIT DEFAULT RISK | 13.0 | 43.2 | 9.0 |
| TRACKING ERROR VOLATILITY | | 43.2 | 100% |
| | | | |
| PORTFOLIO VOLATILITY (bps/mo) | | | 154.0 |
| BENCHMARK VOLATILITY (bps/mo) | | | 144.5 |

PORTFOLIO - BOOKIN TRACKING ERROR, DECEMBER 31, 2003

FIG.10

EXAMPLE OF PORTFOLIO LOSS DISTRIBUTION FROM DEFAULTS, COMPASS SIMULATION

| ASSEST CLASS | OAD | YTW[1] | OAS | AGGREGATE (%) | BOOK MANAGER (%) |
|---|---|---|---|---|---|
| ABS [2] | 2.4 | 8.2% | 50.2bp | 1.2% | 7.1% |
| CREDIT | 5.6 | 8.7% | 77.8 | 16.0% | 28.2% |
| MBS | 4.4 | 8.7% | 62.9 | 28.9% | 21.2% |
| AGENCY | 4.8 | 8.1% | 28.5 | 6.8% | 7.1% |
| | | | | | |
| SPREAD SECTOR (INDEX) | 4.8 | 8.6% | 62.7 | 53.0% | |
| SPREAD SECTOR ("BOOK" MANAGER) | 4.7 | 8.6% | 64.3 | | 63.5% |
| | | | | | |
| INDEX | | | 33.2 | | |
| BOOK MANAGER PORTFOLIO | | | 40.8 | | |

[1] YIELD-TO-WORST VALUES PRESENTED IN THIS REPORT ARE BOOK VALUE-WEIGHTED, WHEREAS OAD AND OAS VALUES ARE MARKET VALUE-WEIGHTED.

[2] THERE WERE NO CMBS IN THE AGGREGATE AS OF THIS DATE.

BOOK MANAGER'S ALLOCATION TO SPREAD PRODUCT, AS OF DECEMBER 31, 1994

FIG.12

| ASSET CLASS | OAD | YTW | OAS | AGGREGATE (%) | BOOK MANAGER (%) |
|---|---|---|---|---|---|
| ABS + CMBS | 2.0 | 4.2% | 64.0bp | 4.4% | 10.0% |
| CREDIT | 5.7 | 4.6% | 75.0 | 24.8% | 40.1% |
| MBS | 2.9 | 4.9% | 24.1 | 35.1% | 30.1% |
| AGENCY | 3.8 | 3.8% | 30.7 | 11.0% | 10.0% |
| | | | | | |
| SPREAD SECTOR (INDEX) | 4.0 | 4.6% | 44.2 | 75.3% | |
| SPREAD SECTOR ("BOOK" MANAGER) | 4.4 | 4.6% | 51.9 | | 90.2% |
| | | | | | |
| INDEX | | | 33.3 | | |
| BOOK MANAGER PORTFOLIO | | | 46.8 | | |

BOOK MANAGER'S ALLOCATION TO SPREAD PRODUCT, AS OF DECEMBER 31, 2004

FIG.13

| PERFORMANCE MEASURE | BOOK MANAGER | TOTAL RETURN MANAGER (WITH T/O) |
|---|---|---|
| PORTFOLIO BOOK VALUE 31 DECEMBER 2004 | $196,474,232 | $213,921,482 |
| PORTFOLIO MARKET VALUE 31 DECEMBER 2004 | $212,686,829 | $217,898,351 |
| BOOK YIELD (DECEMBER 2004) | 5.59% | 4.40% |
| AVERAGE MONTHLY MARKET TOTAL RETURN (JAN 95–DEC 04) | 63.8 bp | 65.7 bp (W/ALPHA) |
| STANDARD DEVIATION OF MONTHLY MARKET TOTAL RETURN | 108.3 bp | 111.4 bp (W/ALPHA) |
| "RISK ADJUSTED" MEAN/STD DEV | 0.59 | 0.59 (W/ALPHA) |
| AVERAGE MONTHLY MARKET TOTAL RETURN (JAN 95–DEC 04) | | 62.6 bp (W/O ALPHA) |
| STANDARD DEVIATION OF MONTHLY MARKET TOTAL RETURN | | 109.9 bp (W/O ALPHA) |
| "RISK ADJUSTED" MEAN/STD DEV | | 0.57 (W/O ALPHA) |
| AVERAGE MONTHLY BOOK RETURN (JAN 95–DEC 04) | 58.8 bp | 54.9 bp (W/ALPHA) |
| STANDARD DEVIATION OF MONTHLY BOOK RETURN | 7.5 bp | 19.9 bp (W/ALPHA) |
| AVERAGE MONTHLY BOOK RETURN (JAN 95–DEC 04) | | 51.8 bp (W/O ALPHA) |
| STANDARD DEVIATION OF MONTHLY BOOK RETURN | | 9.1 bp (W/O ALPHA) |
| AVERAGE MONTHLY BOOK INCOME (JAN 95–DEC 04) | $834,030 | $812,961 (W/ALPHA) |
| STANDARD DEVIATION OF MONTHLY BOOK INCOME | $95,478 | $276,134 (W/ALPHA) |
| AVERAGE MONTHLY BOOK INCOME (JAN 95–DEC 04) | | $751,071 (W/O ALPHA) |
| STANDARD DEVIATION OF MONTHLY BOOK INCOME | | $75,849 (W/O ALPHA) |

MARKET VALUE PERFORMANCE

FIG. 14

| PERFORMANCE MEASURE | BOOK MANAGER | TOTAL RETURN MANAGER (W/O T/O) |
|---|---|---|
| PORTFOLIO BOOK VALUE 31 DECEMBER 2004 | $196,474,232 | $205,345,579 |
| PORTFOLIO MARKET VALUE 31 DECEMBER 2004 | $212,686,829 | $216,044,512 |
| BOOK YIELD (DECEMBER 2004) | 5.59% | 4.92% |
| AVERAGE MONTHLY MARKET TOTAL RETURN (JAN 95–DEC 04) | 63.8 bp | 65.0 bp (W/ALPHA) |
| STANDARD DEVIATION OF MONTHLY MARKET TOTAL RETURN | 108.3 bp | 108.7 bp (W/ALPHA) |
| "RISK ADJUSTED" MEAN/STD DEV | 0.59 | 0.60 (W/ALPHA) |
| AVERAGE MONTHLY MARKET TOTAL RETURN (JAN 95–DEC 04) |  | 61.8 bp (W/O ALPHA) |
| STANDARD DEVIATION OF MONTHLY MARKET TOTAL RETURN |  | 107.1 bp (W/O ALPHA) |
| "RISK ADJUSTED" MEAN/STD DEV |  | 0.58 (W/O ALPHA) |
| AVERAGE MONTHLY BOOK RETURN (JAN 95–DEC 04) | 58.8 bp | 60.1 bp (W/ALPHA) |
| STANDARD DEVIATION OF MONTHLY BOOK RETURN | 7.5 bp | 19.9 bp (W/ALPHA) |
| AVERAGE MONTHLY BOOK RETURN (JAN 95–DEC 04) |  | 57.0 bp (W/O ALPHA) |
| STANDARD DEVIATION OF MONTHLY BOOK RETURN |  | 8.6 bp (W/O ALPHA) |
| AVERAGE MONTHLY BOOK INCOME (JAN 95–DEC 04) | $834,030 | $866,762 (W/ALPHA) |
| STANDARD DEVIATION OF MONTHLY BOOK INCOME | $95,478 | $271,166 (W/ALPHA) |
| AVERAGE MONTHLY BOOK INCOME (JAN 95–DEC 04) |  | $804,856 (W/O ALPHA) |
| STANDARD DEVIATION OF MONTHLY BOOK INCOME |  | $76,917 (W/O ALPHA) |

MARKET VALUE PERFORMANCE IGNORING TURNOVER

FIG. 15

1. INITIAL BKY Amort SCHEDULE

| | | A | C | B | E | D | F | G | H | F | BKY | Bd RETURN |
|---|---|---|---|---|---|---|---|---|---|---|---|---|
| | PERIOD | PDS | CASH FLOW | StdInt | AMORT | BkInc | CurrF | RemAmort | BV | F | BKY | Bd RETURN |
| | | | 1,030,000 | | | | 1,000,000 | -30,000 | 1,030,000 | 1.0000 | 0.0530 | 0.0530 |
| | 1 | 0 | 60,000 | 60,000 | -5,397 | 54,603 | 1,000,000 | -24,603 | 1,024,603 | 1.0000 | 0.0530 | 0.0530 |
| | 2 | 0 | 60,000 | 60,000 | -5,683 | 54,317 | 1,000,000 | -18,921 | 1,018,921 | 1.0000 | 0.0530 | 0.0530 |
| | 3 | 0 | 60,000 | 60,000 | -5,984 | 54,016 | 1,000,000 | -12,937 | 1,012,937 | 1.0000 | 0.0530 | 0.0530 |
| | 4 | 0 | 60,000 | 60,000 | -6,301 | 53,699 | 1,000,000 | -6,635 | 1,006,635 | 1.0000 | 0.0530 | 0.0530 |
| | 5 | 1,000,000 | 1,060,000 | 60,000 | -6,635 | 53,365 | 0 | 0 | 0 | 1.0000 | | |
| | | | | | -30,000 | 270,000 | | | | | | |

INITIAL CURRENT FACE  1,000,000
STATED COUPON  6%
PRICE  103.0000
PREMIUM/DISCOUNT  30,000
ASSUME MATURITY IN YR 5
BKY  0.0530

BOOKIN METHODOLOGY
BOOK ACCOUNTING FOR A BULLET US TREASURY BOND

FIG. 16

BOOKIN METHODOLOGY
BOOK ACCOUNTING FOR MORTGAGE-BACKED SECURITIES (MBS)

1. INITIAL BKY Amort SCHEDULE

| | | A | C | B | E | D | F | G | H | | |
|---|---|---|---|---|---|---|---|---|---|---|---|
| | PERIOD | PDS | CASH FLOW | StdInt | AMORT | BkInc | CurrF | RemAmort | BV | F | BKY Bd RETURN |
| INITIAL CURRENT FACE 1,000,000 | | | -1,030,000 | | | | | | 1,030,000 | 1.0000 | 0.0533 |
| STATED COUPON 6% | 1 | 100,000 | 160,000 | 60,000 | -5,062 | 54,938 | 900,000 | -24,938 | 924,938 | 0.9000 | 0.0533 |
| PRICE 103.0000 | 2 | 100,000 | 154,000 | 54,000 | -4,666 | 49,334 | 800,000 | -20,273 | 820,273 | 0.8000 | 0.0533 |
| | 3 | 100,000 | 148,000 | 48,000 | -4,248 | 43,752 | 700,000 | -16,024 | 716,024 | 0.7000 | 0.0533 |
| PREMIUM/DISCOUNT 30,000 | 4 | 100,000 | 142,000 | 42,000 | -3,809 | 38,191 | 600,000 | -12,216 | 612,216 | 0.6000 | 0.0533 |
| | 5 | 100,000 | 136,000 | 36,000 | -3,346 | 32,654 | 500,000 | -8,870 | 508,870 | 0.5000 | 0.0533 |
| | 6 | 100,000 | 130,000 | 30,000 | -2,858 | 27,142 | 400,000 | -6,012 | 406,012 | 0.4000 | 0.0533 |
| BKY 0.0533 | 7 | 100,000 | 124,000 | 24,000 | -2,344 | 21,656 | 300,000 | -3,668 | 303,668 | 0.3000 | 0.0533 |
| | 8 | 100,000 | 118,000 | 18,000 | -1,803 | 16,197 | 200,000 | -1,865 | 201,865 | 0.2000 | 0.0533 |
| | 9 | 100,000 | 112,000 | 12,000 | -1,233 | 10,767 | 100,000 | -632 | 100,632 | 0.1000 | 0.0533 |
| | 10 | 100,000 | 106,000 | 6,000 | -632 | 5,368 | 0 | 0 | 0 | 0.0000 | 0.0533 |
| | | | | | -30,000 | | | | | | |

FIG. 17A

2. REALITY: SPEEDS < EXP. DECISION AT PERIOD END 3.

| | | A | C | B | E | D | F | G | H | F | BKY | Bd RETURN |
|---|---|---|---|---|---|---|---|---|---|---|---|---|
| | PERIOD | PDS | CASH FLOW | StdInt | AMORT | BkInc | CurrF | RemAmort | BV | F | BKY | Bd RETURN |
| | | | 1,030,000 | | | | 1,000,000 | -30,000 | 1,030,000 | 1.0000 | 0.0533 | |
| | 1 | 75,000 | 135,000 | 60,000 | -5,062 | 54,938 | 925,000 | -24,938 | 924,938 | 0.9250 | 0.0533 | 0.0533 |
| | 2 | 75,000 | 130,000 | 55,500 | -4,832 | 50,668 | 850,000 | -20,106 | 870,106 | 0.8500 | 0.0533 | 0.0533 |
| | 3 | 75,000 | 126,000 | 51,000 | -4,590 | 46,410 | 775,000 | -15,516 | 790,516 | 0.7750 | 0.0533 | |
| | 4 | 175,000 | 221,500 | 46,500 | -4,335 | 42,165 | 600,000 | -11,180 | 611,180 | 0.6000 | 0.0533 | |
| | 5 | 100,000 | 136,000 | 36,000 | -3,401 | 32,599 | 500,000 | -7,780 | 507,780 | 0.5000 | 0.0533 | |
| | 6 | 100,000 | 130,000 | 30,000 | -2,916 | 27,084 | 400,000 | -4,864 | 404,864 | 0.4000 | 0.0533 | |
| | 7 | 100,000 | 124,000 | 24,000 | -2,405 | 21,595 | 300,000 | -2,458 | 302,458 | 0.3000 | 0.0533 | |
| | 8 | 100,000 | 118,000 | 18,000 | -1,867 | 16,133 | 200,000 | -591 | 200,591 | 0.2000 | 0.0533 | |
| | 9 | 100,000 | 112,000 | 12,000 | -1,301 | 10,699 | 100,000 | -710 | 99,290 | 0.1000 | 0.0533 | |
| | 10 | 100,000 | 106,000 | 6,000 | -704 | 5,296 | 0 | -1,414 | 1,414 | 0.0000 | 0.0533 | |
| | | | | | -31,414 | | | | | | | |

INITIAL CURRENT FACE: 1,000,000
STATED COUPON: 6%
PRICE: 103.0000
PREMIUM/DISCOUNT: 30,000
BKY: 0.0533

FIG. 17B

3. NEW TEST AM SCH

| | | | INITIAL CURRENT FACE | 1,000,000 |
| | | | STATED COUPON | 6% |
| | | | PRICE | 103.0000 |
| | | | BKY | 0.054283955 |

| PERIOD | A PDS | C CASH FLOW | B StdInt | E AMORT | D BkInc | F CurrF | G RemAmort | H BV | F | BKY | Bd RETURN |
|---|---|---|---|---|---|---|---|---|---|---|---|
| | | 1,030,000 | | | | 1,000,000 | -30,000 | 1,030,000 | 1.0000 | 0.0543 | |
| 1 | 75,000 | 135,000 | 60,000 | -4,088 | 55,912 | 925,000 | -25,912 | 950,912 | 0.9250 | 0.0543 | |
| 2 | 75,000 | 130,000 | 55,500 | -3,881 | 51,619 | 850,000 | -22,032 | 872,032 | 0.8500 | 0.0543 | |
| 3 | 75,000 | 126,000 | 51,000 | -3,663 | 47,337 | 775,000 | -18,369 | 793,369 | 0.7750 | 0.0543 | |
| 4 | 86,111 | 132,611 | 46,500 | -3,433 | 43,067 | 688,889 | -14,936 | 703,825 | 0.6889 | 0.0543 | |
| 5 | 86,111 | 127,444 | 41,333 | -3,127 | 38,206 | 602,778 | -11,809 | 614,587 | 0.6028 | 0.0543 | |
| 6 | 86,111 | 122,278 | 36,167 | -2,804 | 33,362 | 516,667 | -9,005 | 525,672 | 0.5167 | 0.0543 | |
| 7 | 86,111 | 117,111 | 31,000 | -2,464 | 28,536 | 430,556 | -6,540 | 437,096 | 0.4306 | 0.0543 | |
| 8 | 86,111 | 111,944 | 25,833 | -2,106 | 23,727 | 344,444 | -4,434 | 348,879 | 0.3444 | 0.0543 | |
| 9 | 86,111 | 106,778 | 20,667 | -1,728 | 18,939 | 258,333 | -2,706 | 261,040 | 0.2583 | 0.0543 | |
| 10 | 86,111 | 101,611 | 15,500 | -1,330 | 14,170 | 172,222 | -1,377 | 173,599 | 0.1722 | 0.0543 | |
| 11 | 86,111 | 96,444 | 10,333 | -910 | 9,424 | 86,111 | -467 | 86,578 | 0.0861 | 0.0543 | |
| 12 | 86,111 | 91,278 | 5,167 | -467 | 4,700 | 0 | 0 | 0 | 0.0000 | 0.0543 | |
| | | | | -30,000 | | | | | | | |

FIG. 17C

4. INITIAL BKY Amort SCHEDULE

| | | A | C | B | E | D | F | G | H | F | BKY | Bd RETURN |
|---|---|---|---|---|---|---|---|---|---|---|---|---|
| | PERIOD | PDS | CASH FLOW | StdInt | AMORT | BkInc | CurrF | RemAmort | BV | F | | |
| | | | 1,030,000 | | | | 1,000,000 | -30,000 | 1,030,000 | 1.0000 | 0.0543 | |
| | 1 | 75,000 | 135,000 | 60,000 | -5,062 | 54,938 | 925,000 | -24,938 | 949,938 | 0.9250 | 0.0543 | 0.0533 |
| | 2 | 75,000 | 130,000 | 55,500 | -4,832 | 50,668 | 850,000 | -20,106 | 870,106 | 0.8500 | 0.0543 | 0.0533 |
| | 3 | 75,000 | 126,000 | 51,000 | -1,737 | 49,263 | 775,000 | -18,369 | 793,369 | 0.7750 | 0.0543 | 0.0566 |
| | 4 | 86,111 | 132,611 | 46,500 | -3,433 | 43,067 | 688,889 | -14,936 | 703,825 | 0.6889 | 0.0543 | |
| | 5 | 86,111 | 127,444 | 41,333 | -3,127 | 38,206 | 602,778 | -11,809 | 614,587 | 0.6028 | 0.0543 | |
| | 6 | 86,111 | 122,278 | 36,167 | -2,804 | 33,362 | 516,667 | -9,005 | 525,672 | 0.5167 | 0.0543 | |
| | 7 | 86,111 | 117,111 | 31,000 | -2,464 | 28,536 | 430,556 | -6,540 | 437,096 | 0.4306 | 0.0543 | |
| | 8 | 86,111 | 111,944 | 25,833 | -2,106 | 23,727 | 344,444 | -4,434 | 348,879 | 0.3444 | 0.0543 | |
| | 9 | 86,111 | 106,778 | 20,667 | -1,728 | 18,939 | 258,333 | -2,706 | 261,040 | 0.2583 | 0.0543 | |
| | 10 | 86,111 | 101,611 | 15,500 | -1,330 | 14,170 | 172,222 | -1,377 | 173,599 | 0.1722 | 0.0543 | |
| | 11 | 86,111 | 96,444 | 10,333 | -910 | 9,424 | 86,111 | -467 | 86,578 | 0.0861 | 0.0543 | |
| | 12 | 86,111 | 91,278 | 5,167 | -467 | 4,700 | 0 | 0 | 0 | 0.0000 | 0.0543 | |
| | | 1,000,000 | | | -30,000 | | | | | | | |

INITIAL CURRENT FACE    1,000,000
STATED COUPON    6%
PRICE    103.0000
BKY    0.054283955

FIG. 17D

BOOKIN METHODOLOGY
BOOK ACCOUNTING FOR AN IMPAIRED CREDIT BOND

1. INITIAL BKY Amort SCHEDULE

| INITIAL CURRENT FACE | 1,000,000 |
|---|---|
| STATED COUPON | 6% |
| PRICE | 103.0000 |
| PREMIUM/DISCOUNT | 30,000 |
| ASSUME MATURITY IN YR 5 | |
| BKY | 0.0530 |

| | A | | C | B | E | D | F | G | H | | |
|---|---|---|---|---|---|---|---|---|---|---|---|
| PERIOD | PDS | | CASH FLOW | StdInt | AMORT | BkInc | CurrF | RemAmort | BV | F | BKY | Bd RETURN |
| | | | 1,030,000 | | | | 1,000,000 | -30,000 | 1,030,000 | 1.0000 | 0.0530 |
| 1 | 0 | | 60,000 | 60,000 | -5,397 | 54,603 | 1,000,000 | -24,603 | 1,024,603 | 1.0000 | 0.0530 |
| 2 | 0 | | 60,000 | 60,000 | -5,683 | 54,317 | 1,000,000 | -18,921 | 1,018,921 | 1.0000 | 0.0530 |
| 3 | 0 | | 60,000 | 60,000 | -5,984 | 54,016 | 1,000,000 | -12,937 | 1,012,937 | 1.0000 | 0.0530 |
| 4 | 0 | | 60,000 | 60,000 | -6,301 | 53,699 | 1,000,000 | -6,635 | 1,006,635 | 1.0000 | 0.0530 |
| 5 | 1,000,000 | | 1,060,000 | 60,000 | -6,635 | 53,365 | 0 | 0 | 0 | 1.0000 | 0.0530 |
| | | | | | -30,000 | 270,000 | | | | | |

FIG. 18A

2. REALITY: PERIOD END 2 - BOND IS DOWN

| INITIAL CURRENT FACE | 1,000,000 |
| --- | --- |
| STATED COUPON | 6% |
| PRICE | 103.0000 |
| PREMIUM/DISCOUNT | 30,000 |
| BKY | 0.0530 |

| | A | C | B | E | D | F | G | H | | |
| --- | --- | --- | --- | --- | --- | --- | --- | --- | --- | --- |
| PERIOD | PDS | CASH FLOW | StdInt | AMORT | BkInc | CurrF | RemAmort | BV | F | BKY | Bd RETURN |
| 1 | 0 | 1,030,000 | | | | 1,000,000 | -30,000 | 1,030,000 | 1.0000 | 0.0530 | 0.0530 |
| 2 | 1,000,000 | 60,000 | 60,000 | -5,397 | 54,603 | 1,000,000 | -24,603 | 1,024,603 | 1.0000 | 0.0530 | 0.0530 |
| 3 | | 1,060,000 | 60,000 | -5,683 | 54,317 | 0 | -18,921 | 18,921 | 0.0000 | 0.0530 | 0.0530 |
| 4 | | | | | | | | | | | |
| 5 | | | | | | | | | | | |
| | | | | -11,079 | | | | | | | |

FIG. 18B

3. NEW TEST AM SCH

| | | | A | C | B | E | D | F | G | H | | |
|---|---|---|---|---|---|---|---|---|---|---|---|---|
| | PERIOD | PDS | CASH FLOW | StdInt | AMORT | BkInc | CurrF | RemAmort | BV | F | BKY | Bd RETURN |
| | | 0 | -1,030,000 | | | | 1,000,000 | -30,000 | 1,030,000 | 1.0000 | -0.1699 | |
| | 1 | 0 | 60,000 | 60,000 | -234,955 | -174,955 | 1,000,000 | 204,955 | 795,045 | 1.0000 | -0.1699 | |
| | 2 | 1,000,000 | 1,060,000 | 60,000 | -195,045 | -135,045 | 1,000,000 | 400,000 | 600,000 | 0.0000 | -0.1699 | |
| | | | | | -430,000 | | | | | | | |

INITIAL CURRENT FACE  1,000,000
STATED COUPON  6%
PRICE  103.0000
BKY  -0.16985878

FIG. 18C

4. REVISED BKY Amort Sch

| | | PERIOD | A<br>PDS | C<br>CASH FLOW | B<br>StdInt | E<br>AMORT | D<br>Bklnc | F<br>CurrF | G<br>RemAmort | H<br>BV | F | BKY | Bd RETURN |
|---|---|---|---|---|---|---|---|---|---|---|---|---|---|
| INITIAL CURRENT FACE | 1,000,000 | 1 | 0 | -1,030,000 | | | | 1,000,000 | -30,000 | 1,030,000 | 1.0000 | 0.0530 | 0.0530 |
| STATED COUPON | 6% | 2 | 1,000,000 | 60,000 | 60,000 | -5,397 | 54,603 | 1,000,000 | -24,603 | 1,024,603 | 1.0000 | 0.0530 | 0.0530 |
| PRICE | 103.0000 | 3 | | 660,000 | 60,000 | -424,603 | 364,603 | 400,000 | 400,000 | 0 | 0.0000 | -0.1699 | -0.3658 |
| BKY | -0.16985878 | 4 | | | | | | | | | | | |
| | | 5 | | | | | | | | | | | |
| | | | 1,000,000 | | | -430,000 | -310,000 | | | | | | |

FIG. 18D

BOOKIN METHODOLOGY
BOOK ACCOUNTING FOR CALLABLE BONDS – EXAMPLE 1

1. INITIAL BKY Amort SCHEDULE

| | | | A | C | B | E | D | F | G | H | | | |
|---|---|---|---|---|---|---|---|---|---|---|---|---|---|
| | | PERIOD | PDS | CASH FLOW | StdInt | AMORT | BkInc | CurrF | RemAmort | BV | F | BKY | Bd RETURN |
| INITIAL CURRENT FACE | 1,000,000 | | | 1,030,000 | | | | 1,000,000 | -30,000 | 1,030,000 | 1.0000 | 0.0464 | |
| STATED COUPON | 6% | 1 | 0 | 60,000 | 60,000 | -12,217 | 47,783 | 1,000,000 | -17,783 | 1,024,603 | 1.0000 | 0.0464 | |
| PRICE | 103.0000 | 2 | 1,000,000 | 1,065,000 | 60,000 | -12,783 | 47,217 | -5,000 | -5,000 | 1,017,783 | 1.0000 | 0.0464 | |
| | | 3 | | | | | | | | 0 | | | |
| PREMIUM/DISCOUNT | 30,000 | 4 | | | | | | | | | | | |
| 5 YEAR MATURITY BOND | | 5 | | | | | | | | | | | |
| ASSUME CALL IN YEAR 2 AT 100 5 | | | | | | -25,000 | 95,000 | | | | | | |
| BKY | 0.0464 | | | | | | | | | | | | |

FIG. 19A

2. REALITY: PERIOD END 2 – BOND IS CAL

| INITIAL CURRENT FACE | 1,000,000 |
| --- | --- |
| STATED COUPON | 6% |
| PRICE | 103.0000 |
| PREMIUM/DISCOUNT | 30,000 |
| BkY | 0.0464 |

| | A | C | B | E | D | F | G | H | | |
| --- | --- | --- | --- | --- | --- | --- | --- | --- | --- | --- |
| PERIOD | PDS | CASH FLOW | StdInt | AMORT | BkInc | CurrF | RemAmort | BV | F | BkY | Bd RETURN |
| 1 | 0 | 1,030,000 | | | | 1,000,000 | −30,000 | 1,030,000 | 1.0000 | 0.0464 |
| 2 | 0 | 60,000 | 60,000 | −12,217 | 47,783 | 1,000,000 | −17,783 | 1,017,783 | 1.0000 | 0.0464 | 0.0464 |
| 3 | | 60,000 | 60,000 | −12,783 | 47,217 | 1,000,000 | −5,000 | 1,055,000 | 1.0000 | 0.0464 | 0.0464 |
| 4 | | | | | | | | | | | |
| 5 | | −25,000 | | | | | | | | | |

FIG. 19B

3. NEW TEST AM SCH

| | | | | A | C | B | E | D | F | G | H | | | |
|---|---|---|---|---|---|---|---|---|---|---|---|---|---|---|
| | | | PERIOD | PDS | CASH FLOW | StdInt | AMORT | BkInc | CurrF | RemAmort | BV | F | BKY | Bd RETURN |
| INITIAL CURRENT FACE | 1,000,000 | | | | -1,030,000 | | | | 1,000,000 | -30,000 | 1,030,000 | 1.0000 | 0.0464 | 0.0464 |
| STATED COUPON | 6% | | 1 | 0 | 60,000 | 60,000 | -12,217 | 47,783 | 1,000,000 | -17,783 | 1,017,783 | 1.0000 | 0.0464 | 0.0464 |
| PRICE | 103.0000 | | 2 | 0 | 60,000 | 60,000 | -12,783 | 47,217 | 1,000,000 | -5,000 | 1,005,000 | 1.0000 | 0.0573 | 0.0573 |
| 5 YEAR MATURITY BOND | | | 3 | 0 | 60,000 | 60,000 | -2,430 | 57,570 | 1,000,000 | -2,570 | 1,002,570 | 1.0000 | 0.0573 | 0.0573 |
| ASSUME: CALL IN YEAR 4 AT 100 | | | 4 | 1,000,000 | 1,060,000 | 60,000 | -2,570 | 57,430 | 0 | 0 | 0 | 0.0000 | 0.0573 | 0.0573 |
| BKY | -0.057283195 | | 5 | | | | | | | | | | | |
| | | | | | | | -30,000 | | | | | | | |

FIG. 19C

BOOKIN METHODOLOGY
BOOK ACCOUNTING FOR CALLABLE BONDS – EXAMPLE 2

1. INITIAL BKY Amort SCHEDULE

| | | A | | C | B | E | D | F | G | H | | F | BKY | Bd RETURN |
|---|---|---|---|---|---|---|---|---|---|---|---|---|---|---|
| PERIOD | PDS | | | CASH FLOW | StdInt | AMORT | BkInc | CurrF | RemAmort | BV | | | | |
| 1 | 0 | | | 1,030,000 | | | | 1,000,000 | -30,000 | 1,030,000 | | 1.0000 | 0.0440 | |
| 2 | 1,000,000 | | | 60,000 | 60,000 | -14,677 | 45,323 | 1,000,000 | -15,323 | 1,015,323 | | 1.0000 | 0.0440 | |
| 3 | | | | 1,060,000 | 60,000 | -15,323 | 44,677 | 0 | 0 | 0 | | 1.0000 | 0.0440 | |
| 4 | | | | | | | | | | | | | | |
| 5 | | | | | | | | | | | | | | |
| | | | | | | -30,000 | 90,000 | | | | | | | |

INITIAL CURRENT FACE  1,000,000
STATED COUPON  6%
PRICE  103.0000
PREMIUM/DISCOUNT  30,000
5 YEAR MATURITY BOND
ASSUME: CALL IN YEAR 2 AT 100
BKY  0.0440

FIG.20A

2. REALITY: PERIOD END 2 - BOND IS NOT cal

| INITIAL CURRENT FACE | 1,000,000 |
| --- | --- |
| STATED COUPON | 6% |
| PRICE | 103.0000 |
| PREMIUM/DISCOUNT | 30,000 |
| BKY | 0.0440 |

| | A | C | B | E | D | F | G | H | | F | BKY | Bd RETURN |
| --- | --- | --- | --- | --- | --- | --- | --- | --- | --- | --- | --- | --- |
| PERIOD | PDS | CASH FLOW | StdInt | AMORT | BkInc | CurrF | RemAmort | BV | | | | |
| | | -1,030,000 | | | | 1,000,000 | -30,000 | 1,030,000 | | 1.0000 | 0.0440 | 0.0440 |
| 1 | 0 | 60,000 | 60,000 | -14,677 | 45,323 | 1,000,000 | -15,323 | 1,015,323 | | 1.0000 | 0.0440 | 0.0440 |
| 2 | 0 | 60,000 | 60,000 | -15,323 | 44,677 | 1,000,000 | 0 | 1,000,000 | | 1.0000 | 0.0440 | 0.0440 |
| 3 | | | | | | | | | | | | |
| 4 | | | | | | | | | | | | |
| 5 | | | | -30,000 | | | | | | | | |

FIG.20B

3. NEW BKYLD = 6%

| | | PERIOD | A PDS | C CASH FLOW | B StdInt | E AMORT | D BkInc | F CurrF | G RemAmort | H BV | F | BKY | Bd RETURN |
|---|---|---|---|---|---|---|---|---|---|---|---|---|---|
| INITIAL CURRENT FACE | 1,000,000 | | | -1,030,000 | | | | 1,000,000 | -30,000 | 1,030,000 | 1.0000 | 0.0440 | 0.0440 |
| STATED COUPON | 6% | 1 | 0 | 60,000 | 60,000 | -14,677 | 45,323 | 1,000,000 | -15,323 | 1,015,323 | 1.0000 | 0.0440 | 0.0440 |
| PRICE | 103.0000 | 2 | 0 | 60,000 | 60,000 | -15,323 | 44,677 | 1,000,000 | 0 | 1,000,000 | 1.0000 | 0.0600 | 0.0600 |
| 5 YEAR MATURITY BOND | | 3 | 0 | 60,000 | 60,000 | 0 | 60,000 | 1,000,000 | 0 | 1,000,000 | 1.0000 | 0.0600 | 0.0600 |
| ASSUME: BOND MATURES IN YR 5 | | 4 | 0 | 60,000 | 60,000 | 0 | 60,000 | 1,000,000 | 0 | 1,000,000 | 1.0000 | 0.0600 | 0.0600 |
| BKY | 0.06 | 5 | 1,000,000 | 1,060,000 | 60,000 | 0 | 60,000 | 0 | 0 | 0 | 0.0000 | 0.0600 | 0.0600 |

|        | JAN01 | FEB01 | MAR01 | APR01 |
|--------|-------|-------|-------|-------|
| JAN01  | 4.25  | 4.25  | 4.26  | 4.26  |
| FEB01  |       | 4.27  | 4.27  | 4.28  |
| MAR01  |       |       | 4.27  | 4.28  |
| APR01  |       |       |       | 4.29  |

CURRENT BOOK VALUE WEIGHTS
OF INVESTMENT CONTRIBUTIONS = INITIAL CONTRIBUTIONS × CURRENT BOOK VALUE FACTOR ÷ TOTAL CURRENT BOOK VALUE

= [$1.05mm 0.0 0.0 $0.5mm] × [0.95 n.a. n.a. 1.0] ÷ $1.5mm

= [66.67 0.0 0.0 33.33]

NOTE THAT THE SUM OF THE WEIGHTS EQUALS 1.0.

TO CALCULATE THE COMPOSITE BOOKIN BOOK YIELD, USING THE CURRENT BOOK VALUES OF THE VARIOUS INVESTMENT CONTRIBUTIONS AS WEIGHTS, WE MULTIPLY THE CURRENT BOOK VALUE WEIGHTS BY THE BOOK YIELDS FOR THE CORRESPONDING VINTAGES:

PORTFOLIO Bk Yld = CURRENT BOOK VALUE % × PERFORMANCE MONTH YIELDS FOR VARIOUS VINTAGES

= [66.67 n.a. n.a 33.33] × [4.26% 4.28% 4.28% 4.29%]

= 4.27%

FOR THE PERFORMANCE MONTH APR01, THE BkYld FOR THE INVESTOR'S COMPOSITE BENCHMARK IS 4.27%.

MATRIX OF BOOK YIELDS

FIG.21

| | 11/30/2003 | 12/31/2003 | 1/31/2004 | 2/29/2004 | 3/31/2004 | 4/30/2004 | 5/31/2004 | 6/30/2004 | 7/31/2004 | 8/31/2004 | 9/30/2004 | 10/31/2004 |
|---|---|---|---|---|---|---|---|---|---|---|---|---|
| 11/30/2003 | 4.370044005 | 4.318610661 | 4.296944711 | 4.270968794 | 4.24620491 | 4.29094792 | 4.29453077 | 4.28784278 | 4.27146949 | 4.24454397 | 4.24002075 | 4.22366624 |
| 12/31/2003 | | 4.207553563 | 4.159497714 | 4.132780371 | 4.10752581 | 4.16113476 | 4.16681183 | 4.159739072 | 4.14535032 | 4.11645157 | 4.11304431 | 4.09594528 |
| 1/31/2004 | | | 4.126353304 | 4.069972561 | 4.04441342 | 4.10141348 | 4.10776012 | 4.101645373 | 4.08760931 | 4.05768757 | 4.05466248 | 4.03695248 |
| 2/29/2004 | | | | 3.953765 | 3.90407021 | 3.96698336 | 3.9740029 | 3.900488263 | 3.95415725 | 3.92316131 | 3.92096077 | 3.90257306 |
| 3/31/2004 | | | | | 3.86632485 | 3.89839901 | 3.90424662 | 3.899285994 | 3.88465709 | 3.85398801 | 3.85174619 | 3.83313406 |
| 4/30/2004 | | | | | | 4.50381171 | 4.4820402 | 4.469731657 | 4.45221723 | 4.42448699 | 4.41787157 | 4.40028586 |
| 5/31/2004 | | | | | | | 4.69084038 | 4.654271736 | 4.63613891 | 4.60946211 | 4.60132648 | 4.53510184 |
| 6/30/2004 | | | | | | | | 4.676170972 | 4.63290925 | 4.60382947 | 4.59589108 | 4.57847513 |
| 7/31/2004 | | | | | | | | | 4.56626939 | 4.51097159 | 4.50384914 | 4.48551865 |
| 8/31/2004 | | | | | | | | | | 4.26149473 | 4.22674374 | 4.20600058 |
| 9/30/2004 | | | | | | | | | | | 4.31612211 | 4.26654769 |
| 10/31/2004 | | | | | | | | | | | | 4.21569493 |

LEH MBS BOOKIN: BOOK YIELDS

FIG.22

| | 11/30/2003 | 12/31/2003 | 1/31/2004 | 2/29/2004 | 3/31/2004 | 4/30/2004 | 5/31/2004 | 6/30/2004 | 7/31/2004 | 8/31/2004 | 9/30/2004 | 10/31/2004 | 11/30/2004 |
|---|---|---|---|---|---|---|---|---|---|---|---|---|---|
| 11/30/2003 | 100000000 | 100043293 | 100388809 | 100680329 | 101173149 | 101454937 | 101955744 | 102171705 | 102497518 | 102986560 | 103282148 | 103527277 | 104044091 |
| 12/31/2003 | | 100000000 | 100152503 | 100627753 | 100906885 | 101174225 | 101658067 | 101871405 | 102186989 | 102656774 | 102939624 | 103172832 | 103673685 |
| 1/31/2004 | | | 100000000 | 100287034 | 100561608 | 100819718 | 101292488 | 101503074 | 101811123 | 102276077 | 102554241 | 102782781 | 103272588 |
| 2/29/2004 | | | | 100000000 | 100086106 | 100329485 | 100784441 | 100983467 | 101289020 | 101734283 | 102000751 | 102218365 | 102669481 |
| 3/31/2004 | | | | | 100000000 | 100057603 | 100502292 | 100697604 | 100988028 | 101433781 | 101698744 | 101916270 | 102373583 |
| 4/30/2004 | | | | | | 100000000 | 100317546 | 100560965 | 100908744 | 101412401 | 101723993 | 101998458 | 102504674 |
| 5/31/2004 | | | | | | | 100000000 | 100081591 | 100451685 | 100977733 | 101298970 | 101589535 | 102107123 |
| 6/30/2004 | | | | | | | | 100000000 | 100185061 | 100711828 | 101040776 | 101321796 | 101841984 |
| 7/31/2004 | | | | | | | | | 100000000 | 100336636 | 100658191 | 100931861 | 101439470 |
| 8/31/2004 | | | | | | | | | | 100000000 | 100119728 | 100373494 | 100852570 |
| 9/30/2004 | | | | | | | | | | | 100000000 | 100082120 | 100560572 |
| 10/31/2004 | | | | | | | | | | | | 100000000 | 100293266 |

LEH MBS BOOKIN: BOOK VALUES

FIG.23

| | 12/31/2003 | 1/31/2004 | 2/29/2004 | 3/21/2004 | 4/30/2004 | 5/31/2004 | 6/30/2004 | 7/31/2004 | 8/31/2004 | 9/30/2004 | 10/31/2004 | 11/30/2004 |
|---|---|---|---|---|---|---|---|---|---|---|---|---|
| 11/30/2003 | 0.225304347 | 0.20961211 | 0.20418347 | 0.09666954 | 0.20281589 | 0.1917269 | 0.276917932 | 0.212801932 | 0.166065871 | 0.299259937 | 0.208533451 | 0.205536188 |
| 12/31/2003 | | 0.19409897 | 0.19716738 | 0.07285964 | 0.1868211 | 0.18367019 | 0.269777086 | 0.1980023 | 0.157958244 | 0.28283181 | 0.203902955 | 0.210387933 |
| 1/31/2004 | | | 0.19405792 | 0.07531407 | 0.17796094 | 0.17038522 | 0.266787964 | 0.193209561 | 0.157718968 | 0.271769109 | 0.20144371 | 0.214536667 |
| 2/29/2004 | | | | 0.06953913 | 0.16546495 | 0.1630147 | 0.254434457 | 0.191087881 | 0.149304272 | 0.25912732 | 0.193131584 | 0.205202862 |
| 3/31/2004 | | | | | 0.15604755 | 0.17016769 | 0.252512561 | 0.198238219 | 0.149675508 | 0.258878606 | 0.192207517 | 0.200770436 |
| 4/30/2004 | | | | | | 0.21434133 | 0.299839301 | 0.257363165 | 0.208177659 | 0.307482755 | 0.24721168 | 0.239590511 |
| 5/31/2004 | | | | | | | 0.316625889 | 0.279339707 | 0.225456218 | 0.315240558 | 0.265198673 | 0.2598845 |
| 6/30/2004 | | | | | | | | 0.298139686 | 0.232785615 | 0.315571291 | 0.268247914 | 0.27070098 |
| 7/31/2004 | | | | | | | | | 0.230269494 | 0.308730522 | 0.262375689 | 0.263810007 |
| 8/31/2004 | | | | | | | | | | 0.287063085 | 0.241811016 | 0.243628858 |
| 9/30/2004 | | | | | | | | | | | 0.249521613 | 0.24887463 |
| 10/31/2004 | | | | | | | | | | | | 0.248238948 |

LEH MBS BOOKIN: BOOK RETURNS

FIG. 24

| | 12/31/2003 | 1/31/2004 | 2/29/2004 | 3/21/2004 | 4/30/2004 | 5/31/2004 | 6/30/2004 | 7/31/2004 | 8/31/2004 | 9/30/2004 | 10/31/2004 | 11/30/2004 |
|---|---|---|---|---|---|---|---|---|---|---|---|---|
| 11/30/2003 | 344660 | 1432648 | 1433432 | 1526705 | 1648241 | 2112142 | 1376729 | 1585668 | 1470318 | 1174608 | 1166017 | 1467648 |
| 12/31/2003 | | 441260 | 1413699 | 1523982 | 1638074 | 2087794 | 1370042 | 1573298 | 1448435 | 1162007 | 1151216 | 1438943 |
| 1/31/2004 | | | 570215 | 1503740 | 1623161 | 2077273 | 1357251 | 1552947 | 1433044 | 1159241 | 1140435 | 1416064 |
| 2/29/2004 | | | | 489495 | 1616528 | 2051745 | 1365821 | 1527041 | 1415630 | 1148117 | 1126416 | 1395484 |
| 3/31/2004 | | | | | 335795 | 2027361 | 1346879 | 1477409 | 1393395 | 1132358 | 1114408 | 1378414 |
| 4/30/2004 | | | | | | 566674 | 1396722 | 1508845 | 1420046 | 1157803 | 1143096 | 1411254 |
| 5/31/2004 | | | | | | | 238467 | 1504709 | 1415957 | 1161179 | 1138557 | 1405727 |
| 6/30/2004 | | | | | | | | 482639 | 1422543 | 1165785 | 1129067 | 1399894 |
| 7/31/2004 | | | | | | | | | 547992 | 1156810 | 1115055 | 1378891 |
| 8/31/2004 | | | | | | | | | | 271126 | 1103456 | 1353184 |
| 9/30/2004 | | | | | | | | | | | 263215 | 1349331 |
| 10/31/2004 | | | | | | | | | | | | 472432 |

LEH NIBS BOOKIN: CASH FLOWS

FIG. 25

| | B | C | D | E | F | G | H |
|---|---|---|---|---|---|---|---|
| 1 | | | | | | First inflow date | 5/31/2002 |
| 2 | | | | | | | 6/30/2002 |
| 3 | | | | | | | 7/31/2002 |
| 4 | | | | | | | 8/31/2002 |
| | | | | | | | 9/30/2002 |
| 5 | date | inflows | BV | cashflow | return | yield | 10/31/2002 |
| 6 | 10/31/2002 | $ 100 | $ 100.00 | – | – | 3.265 | |
| 7 | 11/30/2002 | | $ 100.97 | $ 1.18 | 0.206 | 3.267 | |
| 8 | 12/31/2002 | | $ 100.87 | $ 0.05 | 0.270 | 3.268 | |
| 9 | 1/31/2003 | | $ 100.80 | $ 0.08 | 0.270 | 3.269 | |
| 10 | 2/28/2003 | | $ 101.80 | $ 1.16 | 0.270 | 3.267 | |
| 11 | 3/31/2003 | $ 100 | $ 201.69 | $ 0.04 | 0.270 | 3.189 | |
| 12 | 4/30/2003 | | $ 201.55 | $ 0.15 | 0.264 | 3.190 | |
| 13 | 5/31/2003 | | $ 203.49 | $ 2.23 | 0.264 | 3.186 | |
| 14 | 6/30/2003 | | $ 203.27 | $ 0.08 | 0.263 | 3.187 | |
| 15 | 7/31/2003 | | $ 203.12 | $ 0.15 | 0.263 | 3.188 | |
| 16 | 8/31/2003 | | $ 205.11 | $ 2.46 | 0.181 | 3.190 | |
| 17 | 9/30/2003 | | $ 204.88 | $ 0.07 | 0.264 | 3.191 | |
| 18 | 10/31/2003 | | $ 204.73 | $ 0.16 | 0.264 | 3.192 | |
| 19 | 11/30/2003 | | $ 206.63 | $ 5.25 | −1.229 | 3.214 | |
| 20 | 12/31/2003 | | $ 206.39 | $ 1.43 | −0.393 | 3.228 | |
| 21 | 1/31/2004 | | $ 206.23 | $ 1.66 | −0.471 | 3.243 | |
| 22 | 2/29/2004 | | $ 208.32 | $ 5.57 | −1.278 | 3.269 | |
| 23 | 3/31/2004 | | $ 208.09 | $ 1.61 | −0.466 | 3.281 | |
| 24 | 4/30/2004 | | $ 207.93 | $ 3.12 | −1.157 | 3.316 | |
| 25 | 5/31/2004 | | $ 209.84 | $ 9.63 | −3.301 | 3.397 | |
| 26 | 6/30/2004 | | $ 209.60 | $ 3.33 | −1.285 | 3.437 | |
| 27 | 7/31/2004 | | $ 209.45 | $ 3.41 | −1.278 | 3.476 | |
| 28 | 8/31/2004 | | $ 211.74 | $ 9.57 | −3.057 | 3.546 | |
| 29 | 9/30/2004 | | $ 211.53 | $ 3.36 | −1.267 | 3.580 | |
| 30 | 10/31/2004 | | $ 211.39 | $ 3.44 | −1.272 | 3.612 | |
| 31 | 11/30/2004 | | | $ 10.15 | −3.440 | | |

FIG.26

| MONTH | JAN00 MONTHLY BOOKIN | | | JAN02 MONTHLY BOOKIN | | |
|---|---|---|---|---|---|---|
| | JAN00 | JAN02 | JAN05 | JAN00 | JAN02 | JAN05 |
| $MV INVESTMENT | $100 | | | | $100 | |
| $MkP | 100 | 100 | 97 | | 95 | 94 |
| ParAmt | 100 | 100 | 100 | | 105.26 | 105.26 |
| $MkValue | $100 | $100 | $97 | | $100 | $98.94 |
| BkP | 100 | 100 | 100 | | 95 | 96 |
| BkValue | $100 | $100 | $100 | | $100 | $101.05 |
| BkYld | 6% | 6% | 6% | | 7% | 7% |
| MkValue/BkValue | 1.00 | 1.00 | 0.9700 | | 1.00 | 0.9716 |

MONTHLY BOOKIN DATA

FIG.27

BkVALUE WEIGHTS

| | JAN00 | JAN02 | BkYld | BkVALUE |
|---|---|---|---|---|
| JAN00 | 1.00 | 0.00 | 6% | $100 |
| JAN02 | 0.50 | 0.50 | 6.5% | $200 |
| JAN05 | 0.497388 | 0.502612 | 6.5026% | $201.05 |

COMPOSITE BOOKIN DATA

FIG.28

METHODS AND SYSTEMS FOR PROVIDING BOOK ACCOUNTING INDICES

CROSS REFERENCE TO RELATED APPLICATIONS

This application claims the benefit of U.S. Provisional Application No. 60/721,786, filed Sep. 28, 2005. The entire contents of that provisional application are incorporated herein by reference.

INTRODUCTION

While many investors (e.g., a typical total return asset manager) use mark-to-market accounting to value assets and calculate periodic returns, there are other substantial investors (e.g., insurance companies and banks) who use book accounting. Book accounting values a bond at historical cost with smooth periodic adjustments to amortize any premium or discount to par by the time of the bond's anticipated maturity.[1] Discrete adjustments are made to a bond's book value when there is a change to the bond's anticipated maturity or par value due, for example, to prepayments or credit impairment.

[1] Investors typically use book accounting when their liabilities are difficult to price at market and are instead carried at historical value. To better match the valuation of assets and liabilities, book accounting is used for both. For some investors, book accounting is a regulatory requirement.

A bond's book yield is based on its yield at purchase and barring any credit impairment (or, prepayment recalculation in the case of prepaying securities), the bond's book yield will be relatively static until maturity irrespective of changes in market yields. A bond's book value is based on the bond's market (clean) price at purchase, adjusted over time for the difference between the bond's stated interest (coupon) and the bond's book yield. Typically, a bond's book value gradually migrates to par as the bond approaches maturity.

A bond's monthly "book return" may be defined as the bond's monthly book income, which includes the book yield earned over the period (and any adjustments to book income arising from a change in the assumed amortization schedule or any book gains or losses), divided by the bond's beginning of the period book value. Since book income is generally insensitive to market movements, a bond's book return is also much more stable over time compared to its market return.

Assuming little turnover, changes in a portfolio's book yield and book return will also be muted compared to a portfolio's market yields and returns. Consequently, it is not meaningful to compare a portfolio's book return against a market return benchmark (such as the Lehman Aggregate) as a measure of the portfolio's performance. For example, FIG. 1 depicts monthly bond and market returns for an investment in the U.S. Treasury Index in December 1999. Any portfolio cash flows are re-invested in the contemporaneous Treasury Index. The portfolio's book returns are remarkably stabler drifting down slowly over time reflecting the decline in market yields. In contrast, market returns are very volatile. In a given month, a manager using book accounting would have difficulty measuring performance against a market return benchmark.

Trading activity may further confuse relative performance versus a market benchmark. When a bond is sold, book accounting marks the bond to market and recognizes any difference between book value and market value as a book gain or loss. If a bond's market price is up in a particular month (i.e., there is a positive market return) and a "book" manager sells the bond, the bond's book return depends on the bond's book value relative to its market price and may be positive or negative.

How does one measure a manager's performance contribution to a portfolio that uses book accounting? Usually, the quality of a manager is measured by his or her "alpha," which is the portfolio's return versus a benchmark's return. As discussed above, a book manager cannot use a traditional market index (e.g., the Lehman Aggregate) as a performance benchmark since, among other things, the returns are too dissimilar.

The composition of a market index changes monthly as new issues become eligible for inclusion. Traditional active money managers can freely alter their portfolios in reaction to changes in index composition, whereas book investors are often more constrained in portfolio rebalancing. Over time, the current version of a traditional market index may not closely reflect the index in existence when the book investor constructed the portfolio. This makes comparison with a market index less meaningful. In addition, book managers are often required to make non-discretionary transactions. For example, a book manager may be required to raise cash from portfolio sales in such a way as to be book gain/loss neutral. This requirement will force the manager to sell certain bonds that may not have been his or her unconstrained choice. Again, comparing the book manager to a market index return implicitly assumes that the manager has full discretion regarding buy and sell decisions.

Alpha for a book manager could be measured by comparing the income realized by the manager's portfolio at maturity against the income generated by a passive buy and hold investment in the market portfolio corresponding to the date the manager initially purchased assets. The difficulty with this alpha measure is the need to wait for the portfolio to mature before it can be calculated.

Alpha, for an individual book manager, is particularly difficult to measure. Given their long-horizon nature, book portfolios usually contain many "legacy" assets that were acquired long before a particular manager assumed portfolio responsibility. Unlike a traditional market accounting manager, a new book manager typically does not have the liberty to rebalance the portfolio to completely match his or her views.

Alpha at an institutional level that spans the tenure of multiple managers is also difficult to measure. A portfolio's alpha can be measured by comparing the income generated by the portfolio—but only at maturity—with the income generated by a passive "market-neutral" portfolio that makes simultaneous investments with the institution's portfolio and is subject to the same non-discretionary investment decisions. A "market-neutral" passive portfolio, in this context, refers to a set of all bonds (a market portfolio) that would be eligible for inclusion in the book portfolio with no managerial decision as to which bonds to select.

SUMMARY

An alternative measure of book portfolio performance is to compare a portfolio's book yield to a passive buy and hold portfolio's yield—i.e., to measure whether the portfolio is "out-yielding" a passively managed portfolio. Essentially, book yield is a measure of a portfolio's income-generating capability. As such, it often has little to say about a portfolio's past performance. In an environment of downgrades, defaults, and other prepayments, a portfolio's current book yield may not reflect earlier poor performance. A book portfolio may have a higher book yield than a passive portfolio but be clearly underperforming. If market yields are rising, a manager that experiences book losses from downgrades, defaults, and prepayments will have more opportunities to invest new cash at higher yields. In contrast, if the passive portfolio experiences fewer prepayment events and book losses, the portfolio's book yield may be lower. However, the passive portfolio's cumulative book income generation will likely be superior to that of the manager's portfolio.

As a result, while it is difficult to measure a portfolio's relative performance with a single number, there is some advantage to constructing a passive "market-neutral" portfolio as a performance benchmark and comparing its cumulative book income and book yield against the manager's portfolio. For investors concerned with book yield and risk-adjusted book returns, book accounting indices may be used as performance benchmarks.

In a preferred scenario, an investor passively invests in an index (say, the Aggregate, Municipal, or the investor's own customized index) as if it were a portfolio. The composition of this portfolio is then fixed (except for future cash re-investment) and the portfolio's book yield, book income, and book return are calculated, and then compared to the investor's own portfolio. The performance of an investor's book accounting index reflects what the investor could have achieved (in book accounting terms) by passively investing in the underlying index, and allows third-party and internal managers to more accurately demonstrate the value of their portfolio management.

Because the book accounting performance of an index depends on the timing and amounts of cash inflows and outflows (and the particular rules for handling such cash flows) preceding the current performance month, no two investors will likely have the same book index even if their underlying index is the same. By its very nature, a book index must be customized for each investor. To accommodate investors, a custom book index builder may be used (via an Excel spreadsheet) that allows investors to input their historical "vector" of cash inflows and outflows (including rules) so as to produce book accounting values in the current month. Investors also have the choice of supplying their vector of cash inflows and outflows and having book accounting values generated and reported through index production channels.

The benchmark's book yield and book income are an indication of what could be achieved if the manager followed a passive strategy. However, a manager will naturally try to do better by adjusting the asset allocation mix, overweighting (underweighting) sectors that appear cheap (rich), and by adding issues of a given peer group that trade at a wider spread given their credit outlook. Often, the manager's book yield will exceed that of his or her benchmark. But at what risk to future book income? Portfolio analytics tools may be used to assess whether a book manager is adding value on a risk-adjusted basis.

Finally, the availability of book indices permits quantitative empirical studies on various portfolio strategies. For example, a client who uses book accounting may wish to consider whether it would have been better to have its assets managed by a traditional "book accounting" manager (who buys and holds with a spread overweight) or a traditional "total return" manager (who trades actively to generate outperformance, or alpha).

In at least one aspect, the invention comprises a method comprising the steps of: identifying a first portfolio of securities as corresponding, at a specified time, to an index; calculating, for the first portfolio, a first set of performance values comprising one or more of: book yield, book income, and book return; calculating, for a second portfolio of securities, a second set of performance values corresponding to the first set of performance values; and comparing the second set of performance values to the first set of performance values to obtain a performance measure for the second portfolio.

In various embodiments: (1) the first and second sets of performance values comprise book yield, book income, and book return; (2) the securities are bonds; (3) the index is a custom index; (4) the first portfolio is managed according to a passive investment strategy; (5) the passive investment strategy comprises a buy and hold strategy; (6) the passive investment strategy comprises a modified buy and hold strategy; (7) the passive investment strategy comprises a strategy of continually matching the index; (8) the passive investment strategy comprises a strategy of tracking an external target variable; (9) the passive investment strategy comprises replicating cash outflows from the second portfolio in the first portfolio by implementing corresponding cash outflow instructions; (10) the first portfolio follows book accounting principles analogous to book accounting principles followed by the second portfolio; (11) the securities comprise bonds, and wherein each bond's book yield equals the bond's bond-equivalent yield at time of purchase; (12) the securities comprise bonds, and wherein each bond's book value equals the bond's market price at time of purchase; (13) the securities comprise bonds, and wherein each bond's book return equals the bond's book income for a specified performance month divided by the bond's book value at the beginning of the specified performance month; (14) the securities comprise bonds, and wherein each bond's book income equals the bond's book yield for a specified performance month multiplied by the bond's book value for the month immediately preceding the specified month, plus any necessary adjustments to the book income for the month immediately preceding the specified month, plus any final adjustments to the bond's final book value; (15) the securities comprise one or more prepaying securities; (16) for each of one or more of the prepaying securities, book yield is calculated using a prepayment vector; (17) book yield is recalculated when actual prepayment experience or forecast of prepayments going forward differs from what was assumed in an initial month; (18) the securities comprise one or more impaired credit bonds; (19) each of one or more of the impaired credit bonds is assumed to be sold from the first portfolio at the end of a month in which the impaired credit bond is impaired; (20) a cash flow generated by the first portfolio is re-invested in a portfolio corresponding to the index within two months of generation of the cash flow; and (21) the method further comprises comparing the second set of performance values to the first set of performance values and performance values for each portfolio corresponding to a cash flow.

In at least one other aspect, the invention comprises a method comprising: reviewing a performance measure based on a comparison of a first set of performance values for a first portfolio of securities and a second set of performance values for a second portfolio of securities, wherein the first portfolio of securities corresponds, at a specified time, to an index; wherein the first set of performance values comprise one or more of: book yield, book income, and book return; and wherein the second set of performance values corresponds to the first set of performance values.

In at least one other aspect, the invention comprises software stored on a computer readable medium, comprising: software for calculating, for a first portfolio of securities identified as corresponding, at a specific time, to an index, a first set of performance values comprising one or more of: book yield, book income, and book return; software for calculating, for a second portfolio of securities, a second set of performance values corresponding to the first set of performance values; and software for comparing the performance values for the first portfolio to the corresponding performance values for the second portfolio to obtain a performance measure for the second portfolio.

In at least one other aspect, the invention comprises a method comprising: accessing via a computer network a performance measure based on a comparison of a first set of performance values for a first portfolio of securities and a second set of performance values for a second portfolio of securities, wherein the first portfolio of securities corresponds, at a specified time, to an index; wherein the first set of performance values comprise one or more of: book yield, book income, and book return; and wherein the second set of performance values corresponds to the first set of performance values.

BRIEF DESCRIPTION OF THE DRAWINGS

FIGS. 3(a) and 3(b) depict sample book yields and book returns for MBS BOOKINs.

FIG. 5 shows a comparison of the manager's portfolio and BOOKIN at various dates since Dec. 31, 2003.

FIG. 6 presents a comparison between the portfolio and BOOKIN benchmark.

FIG. 7 depicts market structure reports for the portfolio and BOOKIN benchmark.

FIG. 8 is a table depicting BOOKIN tracking error.

FIG. 9 lists names in the portfolio.

FIG. 10 shows overall monthly tracking error.

FIGS. 12 and 13 show a book manager's allocation to spread product.

FIG. 14 depicts market value performance with turnover.

FIG. 15 depicts market value performance ignoring turnover.

FIG. 16 shows an example of book accounting for a bullet U.S. Treasury bond.

FIG. 21 depicts a matrix of book yields, and related calculations.

FIGS. 22-25 depict sample BOOKIN data.

FIG. 26 depicts a preferred spreadsheet interface.

FIG. 27 depicts exemplary monthly BOOKIN data.

FIG. 28 depicts exemplary composite BOOKIN data.

DETAILED DESCRIPTION OF VARIOUS EMBODIMENTS

Constructing Performance Benchmarks for Book Managers

Figure 1:
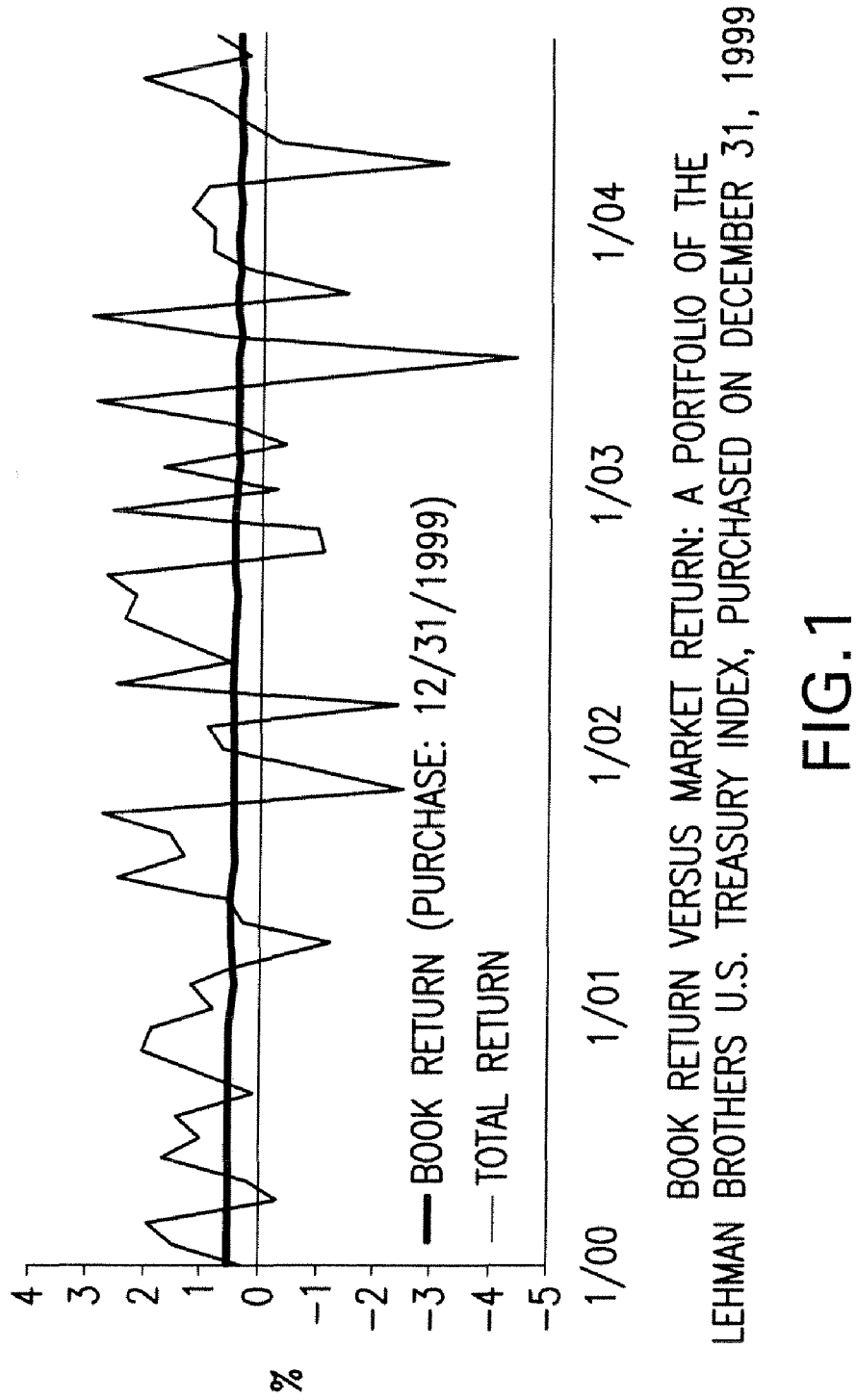
FIG. 1 depicts monthly bond and market returns for an investment in the U.S. Treasury Index in December 1999.

Imagine a book manager who has a new client and an initial cash inflow to invest. The book manager will select specific bonds that constitute the portfolio. As the portfolio generates cash flow, the manager will select assets in the marketplace to reinvest this cash at current market yields. The portfolio's performance will be calculated according to specific book accounting guidelines: when to recognize a credit impairment; when to update prepayment realizations and expectations; how to handle callables; etc. Also, from time to time the manager may receive additional client cash inflows to invest. Again, the manager will select assets in the marketplace with which to reinvest this cash at current market yields. Finally, the manager may be called up to raise cash from the portfolio for the client and may receive non-discretionary instructions on how that cash is to be generated (e.g., gain/loss neutral).

Now imagine a passive manager with the same client and initial cash inflow. By the term "passive" we mean simply a manager that makes no investment decisions (e.g., timing, sector, and security selection). When cash must be put to work the manager simply buys the market. The passive manager also follows the same guidelines and rules as established by the client. By comparing the performance of the passive manager with the actual manager, we are implicitly giving the client a choice: invest in a portfolio that follows a passive investment strategy or invest in a portfolio wherein the manager has some scope to make active decisions. The performance difference (book yield and cumulative income) between the two represents the book manager's value added.

To construct a passive book portfolio, the following rules preferably are established at the outset:

i. What is the underlying investment (and re-investment) universe?

When the passive manager receives a client investment inflow what must the manager buy? For example, the client may instruct the manager that he or she may invest only in the Aggregate. Consequently, the passive investment rule for the manager is to buy the composition of the Aggregate when the client makes an investment. In other words, the passive manager makes no investment decisions (e.g., timing, sector, and security selection). In practice, the underlying index is likely to be a custom index (say, 70% U.S. Credit Index and 30% MBS Index). In fact, clients have very detailed and customized passive investment rules (e.g., 63% A+-rated or better bonds in the Credit Index that were issued in the last five years with at least $500 million outstanding and with an issuer cap of 2%, 25% current-coupon MBS Index, 10% AAA-rated Municipal Index with a remaining time to maturity of ten years or less, and 2% 3-month LIBOR). Usually, but not always, a client's reinvestment universe is the same as the initial investment universe.

ii. What is the Passive Strategy?

Suppose the passive manager receives an investment inflow and buys the Aggregate (or any other index). Next month the Aggregate will have changed (new bonds in and some existing bonds dropping out). What strategy should the passive manager follow? Listed below are just some of the possibilities:

a. Follow a buy and hold strategy. Once assets are purchased, continue to hold them even if they fall out of the underlying Aggregate Index (say, because maturity falls below one year).

b. Follow a modified buy and hold strategy. Once assets are purchased, continue to hold them even if they fall out of the underlying Aggregate Index (say, because maturity falls below one year), unless they fall out of the index for some other specified reason (say, because they are downgraded below investment-grade).

c. Continually match the Aggregate. If necessary, sell bonds that are leaving the Aggregate and buy bonds that are entering. If more bonds are entering than leaving, sell a pro rata portion of existing holdings to be able to acquire new bonds in proportion.

d. Track an external target variable, such as maintain a certain option adjusted duration ("OAD") or asset allocation. (Option adjusted duration is the modified duration of a bond after adjusting for any embedded optionality.) For example, the initial investment may produce an OAD of 4.0. The passive strategy is to continually keep the passive portfolio's OAD equal to 4.0 irrespective of what happens to the Aggregate's OAD. Such a strategy will involve buying and selling of bonds in the benchmark to meet the target.[2]

[2] Alternatively, some clients may ask that no assets be sold to reach a target. Instead, the passive strategy will do its best to track the external target variable by using any available cash flow generated by the portfolio to "nudge" the portfolio towards the external variable.

iii. How to Handle Cash Outflows?

From time to time a client may request that the book manager raise cash from the portfolio. Generally the client will give the manager specific (i.e., non-discretionary) instructions on how to raise cash. The passive benchmark is constructed in such a way that it, too, will follow the same non-discretionary instructions. For example, the client may request a. Raise $X in cash but be book gain/loss neutral;

b. Generate $Y in book gains (losses) and reinvest the cash generated in the passive benchmark by buying bonds in the current investment universe. Even within this category there may be directions given to the manager (e.g., generate as much cash to meet the gain/loss target or generate as little cash as possible);

c. Raise $X in cash with no book gain/loss goal and do so by selling previous investments on a pro rata basis; or d. Raise $X in cash with no book gain/loss goal but maximize the subsequent book yield on the portfolio.

Many other options are available. The important issue is that the passive manager must follow the same non-discretionary rules as the book manager. For the construction of the book index performance benchmark, each client cash flow outflow can follow its own particular rule. This reflects the reality for the book manager.

iv. Specify the Book Accounting Rules to Follow.

Finally, the book index performance benchmark must follow the same book accounting conventions as the book manager. Specifically, the book index follows standard book accounting treatment and carries assets at their book value unless the asset becomes impaired, amortizes differently than expected at purchase, or is sold.[3] How does book accounting work? Generally speaking, when an investor buys a bond, he or she records its purchase (clean) price and yield which is the bond's book yield. For each month thereafter, the investor records "book income" for the bond based on this book yield at purchase. The difference between a bond's monthly stated income (based on the bond's coupon) and its book income equals the amortization amount to adjust the bond's book value.

[3] However, some book indices may follow different accounting rules than others. For example, banks under GAAP have a book accounting treatment for callables that differs from the statutory accounting treatment followed by many insurance companies. Book indices can be customized according to the client's accounting conventions.

Book Yield: A bond's book yield equals its bond-equivalent yield at time of purchase. For book accounting indices, the time of purchase is defined as the beginning of the month in which the bond is purchased. This month is called the purchased bond's "vintage" month. So the book yield reported for the JAN04 Aggregate book accounting index equals the book value-weighted book yield for all the bonds in the Aggregate at the beginning of January 2004.

Book Value: A bond's book value equals its market (clean) price at time of purchase. Over time, the bond's book value may change. For bonds purchased at a premium, the premium amount must be amortized over the bond's life. Consequently, the bond's book value will decline over time (each month declining by the amortization amount) until the bond's book value equals par at maturity. Similarly, for bond's purchased at a discount (below par), the discount amount must be amortized over the bond's life so that at maturity the bond's book value will also equal par.

Generally, a bond's book value changes very gradually if at all. However, there are some special cases where a bond's book value (and its book yield) can change significantly from month to month. These events are usually associated with a change in the prepayment assumption for prepaying securities (e.g., mortgage backed securities ("MBS")) and with a credit impairment for credit-risky bonds.

Book Income: Book income generally equals the bond's book yield for the performance month multiplied by the bond's prior month book value, plus any adjustments (if needed) to the prior month's book income (some special cases are discussed below) plus any final adjustments to the bond's final book value.

There are several special cases. Two are of particular interest: prepaying securities and impaired credit securities.[4] When an MBS or another prepaying security is purchased, its book yield is calculated assuming a prepayment vector. If the actual prepayment experience and/or forecast of prepayments going forward differs from that assumed in the initial month, then book yield must be recalculated (using the retrospective yield method[5]). The recalculated book yield will produce a revised book income in each month following the initial month. Although prior book income values are not restated, the book yield in the current performance month is adjusted to reflect book yield adjustments required for all of the prior months.

[4] Other special cases are callable and putable (non-MBS) bonds. There are a couple of possible accounting treatments for such bonds, know to those skilled in the art, which book indices can accommodate.

[5] A good summary of the retrospective yield method is: "Had I known at purchase what I now know about the bond's actual and expected cash flows, then this is what I would have used as its book yield."

Another special case is the handling of "impaired" credit bonds. Many book investors define an impaired bond as one that is downgraded below investment-grade.[6] We assume such a bond is sold from the book index at the end of the month that the bond is impaired. When the bond is sold (typically at the month-end index price plus accrued) the sale proceeds are recognized as the final cash flow. As with MBS, the following steps preferably are performed: Go back to the purchase date and recalculate the bond's book yield, following the rule that "If I knew then what I know now . . . ;" and recalculate the amortization schedule and calculate book income in the downgrade month ($t_{DG}$) equal to book income$_{tDG}$=book yield$_{tDG} \times BV_{tDG-1}$+the write-down due to the impairment.

[6] Some investors may follow a different definition of impairment. Book indices can accommodate an investor's particular impairment definition.

Book Return: Book return (not a strict accounting term) equals the bond's book income for the performance month divided by the beginning of the month book value.

BOOKINs

One embodiment of the present invention provides book accounting indices (for ease of reference, referred to herein as "BOOKINs") that are replicable (in theory) benchmarks for book accounting investors. A BOOKIN mimics a passive investment in an index (say, the Aggregate or an investor's custom index) as if it were a portfolio. (A BOOKIN associated with the Aggregate is referred to as an "Aggregate BOOKIN." Note that the composition of a BOOKIN is identical to its corresponding index only at the time of the initial investment.) The composition of this portfolio is then fixed and its book yield, book income, and book return are calculated.[7] Any subsequent cash flows generated by the BOOKIN (coupon, prepayments, or proceeds from maturities) are reinvested in the corresponding index that is contemporaneous with the cash flow. Over time the portfolio, which originally which was identical with the underlying index, will become a conglomeration of the remaining initial investment in the index plus smaller investments in subsequent indices.

[7] Other portfolio values may be reported as well, including: book gains/losses, amortization, as well as market related values including market value, duration, convexity, credit quality, option adjusted spread ("OAS"), and sector distributions.

The interpretation of an investor's BOOKIN performance reflects what the investor could have achieved if the investor passively invested in the index. The performance of the BOOKIN (in book accounting terms) can then be compared to the investor's portfolio.

A fundamental difference between a BOOKIN and a traditional market index is that the BOOKIN's performance during a given month, called the "performance month," depends on the BOOKIN's "vintage month," i.e., the month in which the BOOKIN was established. There are several reasons for this:

1. A BOOKIN is relatively static and its composition is not rebalanced every month as is a traditional market index based on the latter's inclusion rules. Once a bond enters a BOOKIN, it stays there until it matures, is called, or is downgraded. Therefore, the underlying index that constitutes the initial BOOKIN continues to represent the bulk of the BOOKIN for a long time.

2. The BOOKIN takes all the cash flows received in a particular month (say, month N) and reinvests them in the underlying index of month N+1. Since the JAN00 BOOKIN and the FEB00 BOOKIN on the same underlying index differ in any subsequent month N, they will receive different amounts of cash flows in month N, and will therefore re-invest different amounts in the underlying index of month N+1.

Figure 2:
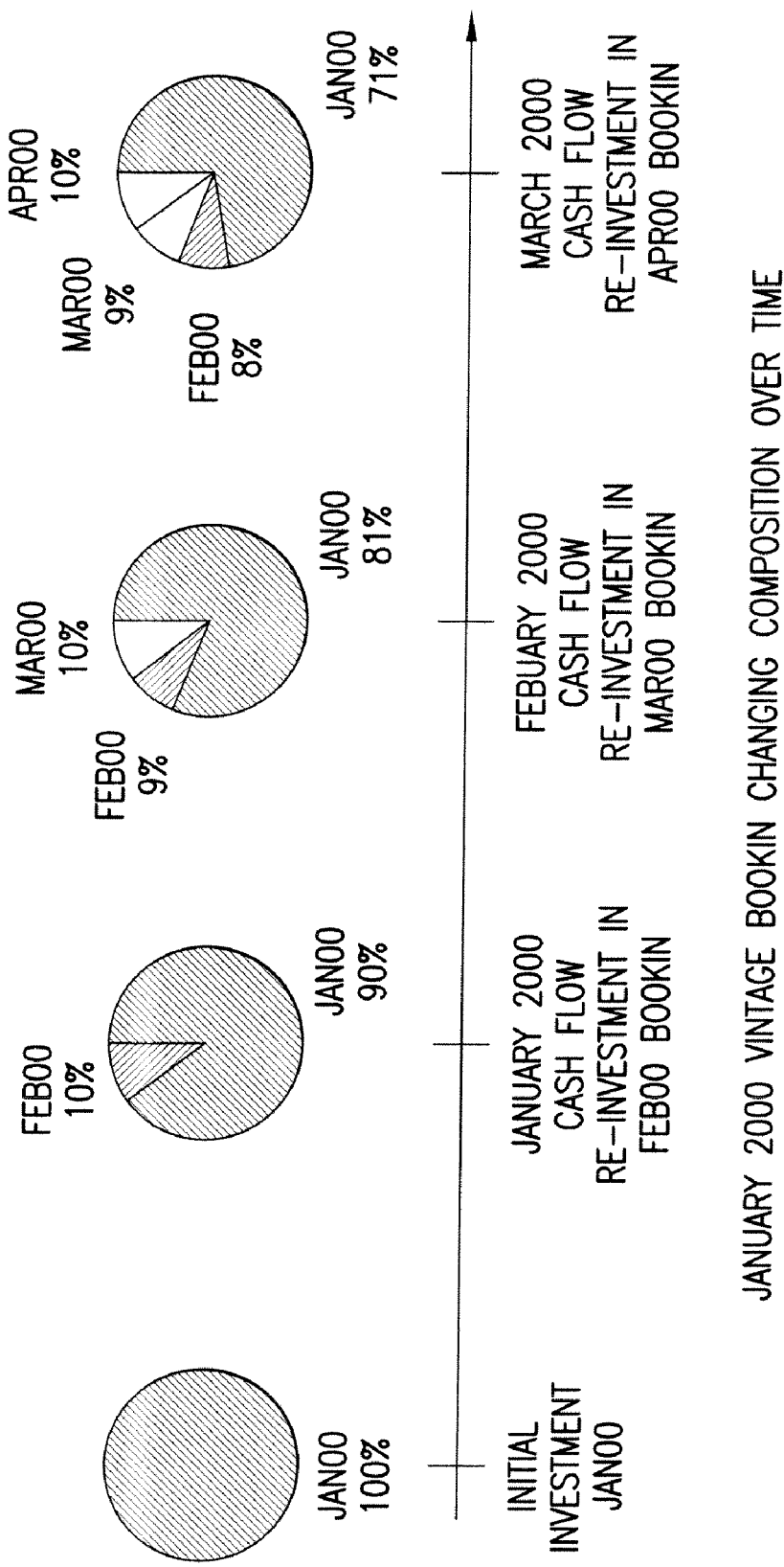
FIG. 2 illustrates the changing composition of a given vintage BOOKIN over time.

FIG. 2 illustrates the changing composition of a given vintage BOOKIN over time. Suppose the investor receives an investment contribution at the beginning of JAN00 and the investor's underlying index is the Aggregate. Assume also that there are no further investment contributions. The investor's book accounting benchmark is the JAN00 Aggregate BOOKIN. FIG. 2 shows that the investor's JAN00 BOOKIN is 100% invested in the Aggregate as of the beginning of January 2000.

Suppose in January, the JAN00 BOOKIN generates some cash flow (e.g., coupon payments and prepayments). For illustration purposes suppose the amount of the cash flow amounts to 10% of the February 2000 book value of the JAN00 BOOKIN. This 10% is then invested in the FEB00 Aggregate BOOKIN. Consequently, by the beginning of February 2000, the JAN00 BOOKIN is now a composite with 10% invested in the FEB00 BOOKIN and 90% invested in whatever remains of the original JAN00 BOOKIN.

Next, the next cash flows for the JAN00 BOOKIN will likely occur during February 2000. These cash flows are generated both from the 10% of the portfolio that is invested in the FEB00 BOOKIN and the 90% of the portfolio invested in the original JAN00 BOOKIN. For illustration purposes only suppose the amount of the cash flow amounts to 10% of the March 2000 book value of the JAN00 BOOKIN. This February 2000 cash flow is then invested in the MAR00 Aggregate BOOKIN. Consequently, in March 2000, the JAN00 BOOKIN has approximately 10% invested in the MAR00 BOOKIN, 9% invested in whatever remains of the original FEB00 BOOKIN and 81% invested in whatever remains of the original JAN00 BOOKIN. And so on. FIG. 2 illustrates how the composition of the JAN00 BOOKIN changes over time.

It is important to note that book accounting values (e.g., income and yield) of each bond in a performance month depends on the month in which the bond was acquired. Therefore, even if the JAN00 BOOKIN and the FEB00 BOOKIN each contain the same bond, they may not handle that bond the same way. The JAN00 BOOKIN may have purchased the bond at the beginning of January and that position may earn a different book yield and income than if the bond was acquired in February 2000. This is a notable difference between a book index and a market index: a book index must always keep track of each bond and the date it was added to the index. In contrast, a market index only needs to know the beginning of the month price of each bond.

Since a BOOKIN's performance in a given performance month depends on its vintage month, results are presented in a two-dimensional table (vintage month by performance month). Sample book yields and book returns for MBS BOOKINs are presented in FIGS. 3(a) and 3(b).

Measuring Performance Using Book Accounting Indices

How does a book accounting investor use the book accounting indices as a performance benchmark? Again, the book accounting indices represent a passive strategy for the investor: buying and holding all the bonds in the underlying index at the beginning of the month that the assets are invested. Any cash flows generated by the passive portfolio would be reinvested in the underlying index contemporaneous with the cash flow. If the investor has only a single initial investment to make, then the performance benchmark is simply the BOOKIN whose vintage month corresponds to the initial investment month. However, an investor's portfolio is likely to be much more complicated, with numerous investment inflows and cash outflows.

Suppose the investor makes an initial investment (say, January 2001) but subsequently (say, April 2001) makes another investment. Until April 2001, the investor's performance benchmark is the JAN01 BOOKIN (for the investor's underlying index). Beginning in April 2001, however, the investor has two vintage BOOKIN investments: the JAN01 BOOKIN and now the APR01 BOOKIN. The weights for the investor's "composite" BOOKIN are the current book value weights of the two investments. For example, if the initial JAN01 investment was $1,050,000, the book value of that investment as of the beginning of APR01 was $1,000,000, and the investment at the beginning of APR01 was $500,000, then the two weights for the performance months beginning in APR01 are 0.67 and 0.33, respectively. Outflows add further complexity. In which months do outflows occur? Under which rules is cash raised (e.g., maximize loss or gain/loss neutral)?

Since the performance of a book index depends on the timing and amounts of cash inflows and outflows (and particular rules followed) preceding the current performance month no two investors will likely have the same book index even if their underlying index is the same.

Figure 4:
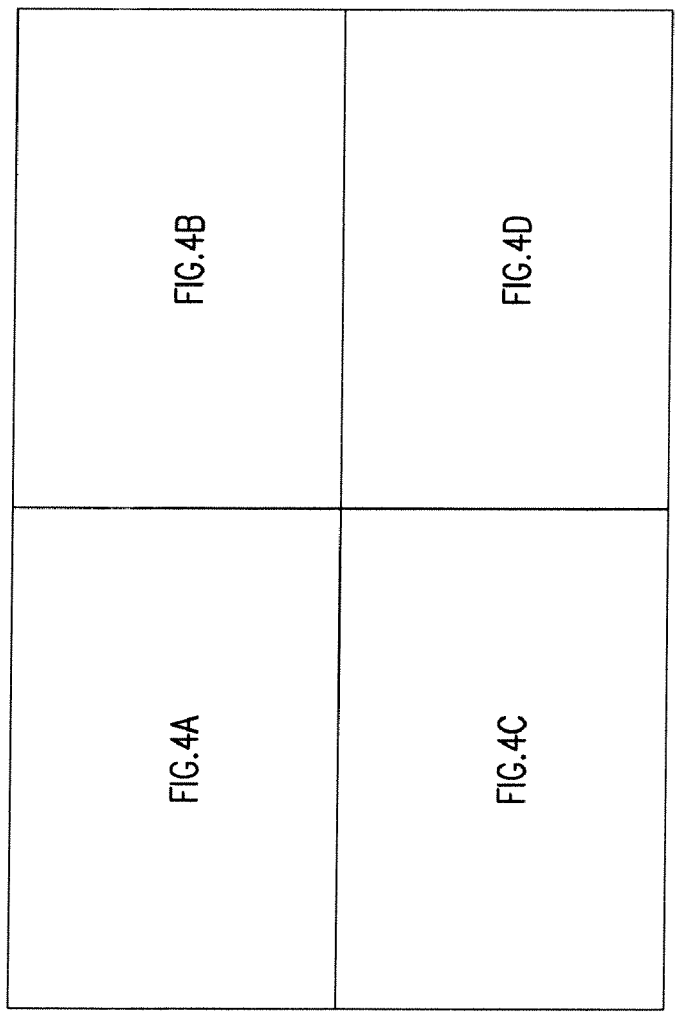
FIG. 4 shows an example of a custom BOOKIN builder.
Figure 4A:
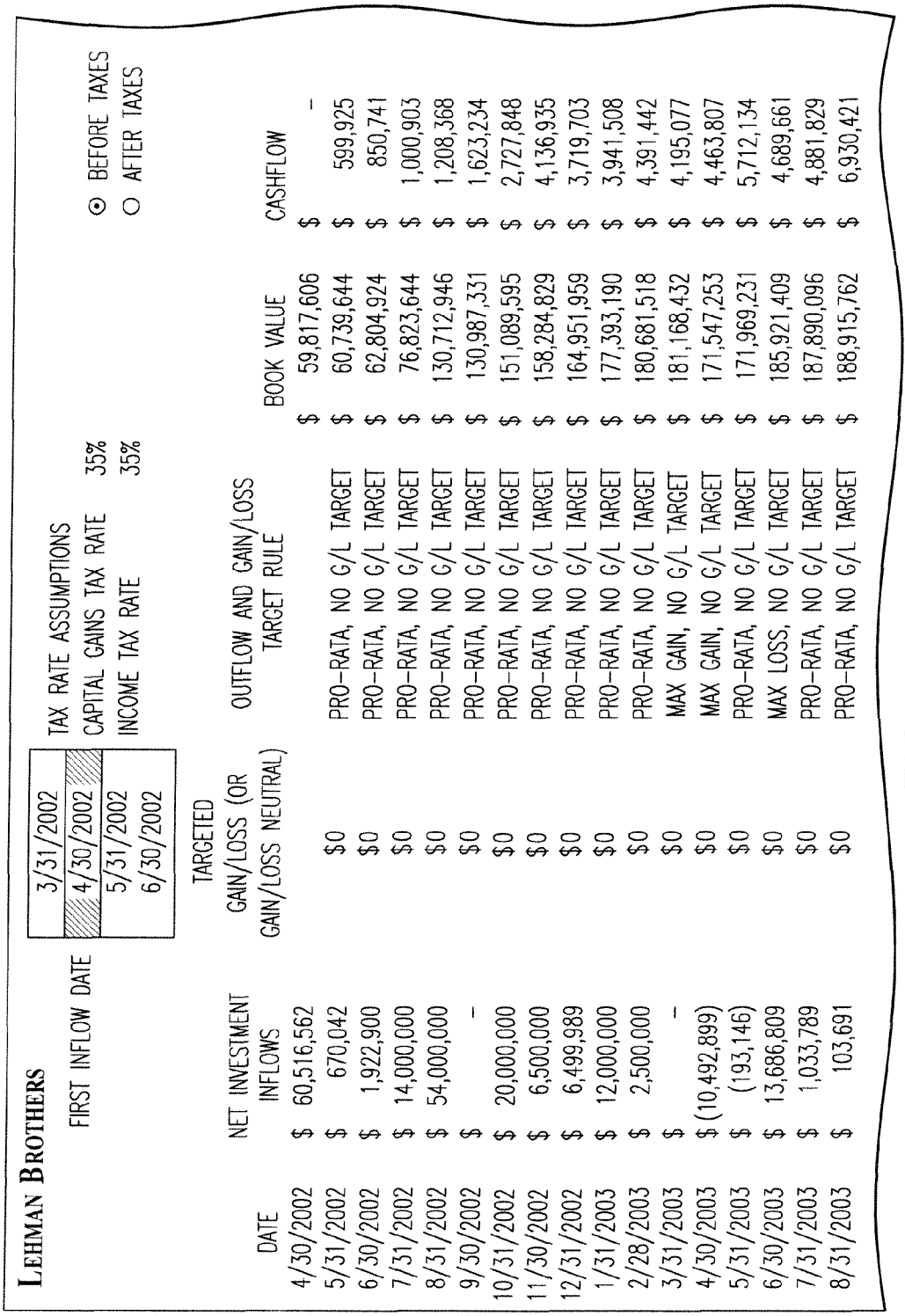

By its very nature, each book index must be customized for each investor. To accommodate investors, a custom BOOKIN builder (constructed via an Excel spreadsheet) may be used to allow investors to input their historical "vector" of cash inflows and outflows (including rules) so as to produce book accounting values in the current month. FIG. 4 shows an example of a custom BOOKIN builder. The underlying index for the investor is assumed to be the Aggregate. The investor's portfolio began with a $60.5 million investment in April 2002 and there were numerous monthly investments thereafter. In addition, the investor had a $10.5 million cash outflow in April 2003 and the investor required that the cash be raised in such a way as to maximize the book gain. (Note that the $5 million cash raised in August 2004 followed a pro rata rule).

The custom BOOKIN builder spreadsheet produces book accounting values (book yield, book income, book value, book return, etc.) as well as numerous market based values (market value, OAD, OAC, etc.).[8] Investors also have the choice of supplying their vector of cash inflows and outflows and having book accounting values generated and reported them on a website.

[8] Alternate versions of the custom BOOKIN builder provide a breakdown of why the benchmark's book yield is changing from month to month; change in prepayment estimates for prepaying securities; effect of impaired credit bonds; impact of bonds being called; impact of re-investment of cash flows at significantly different book yields; and matured bonds leaving the BOOKIN.

Managing Against a Book Accounting Index—"A Book Yield Advantage, but at What Risk?"

A manager of a book accounting portfolio is likely to follow different portfolio strategies than if he or she were managing a marked-to-market portfolio. Book managers tend to trade less actively compared to their total return counterparts.

First, while a book manager at a listed company may be able to profitably trade the portfolio, any gains are reported as "trading gains" and may be heavily discounted by equity analysts as a dependable source of earnings. Consequently, the manager may more effectively demonstrate skill by identifying assets for purchase that will supply a reliably large book income over time. This is why book managers may place more emphasis on correctly estimating default probabilities over the life of a bond as opposed to the bond's short-term price volatility.

Second, since total return managers are measured versus their total return benchmark on a monthly basis, persistent monthly underperformance or high monthly tracking error will cast the total return manager in a poor light. As a result, the total return manager must successfully anticipate monthly valuation changes in both the portfolio and benchmark. For example, both the book and total return manager may identify a bond as an attractive long-term income producing asset. However, the total return manager will be tempted to temporarily underweight or overweight the bond in the portfolio in anticipation of short-term changes in market price. Such a focus will generally lead to more portfolio trading activity for the total return manager.[9] Barring a credit or prepayment event, a portfolio's book income and book yield are relatively impervious to spread changes in the market. As a result, a book manager may buy a wide-spread credit asset to produce a steady book income and book yield advantage over the benchmark. The manager continues to enjoy this advantage even if the bond's spread widens, as long as the bond does not become credit impaired or prepays. In contrast, a total return manager buying the same asset would be penalized as soon as the asset's market performance began to deteriorate.

[9] Another reason a book manager may follow a buy and hold strategy is because the manager may have limited scope for trading and must anticipate having to hold an asset for long periods. Many book managers are part of larger institutions with many profit and loss centers. Due to circumstances in other parts of the institution, the book manager may be constrained from trading as it may produce an undesired book gain or loss. Consequently, a book manager may be reluctant to buy a bond for a short-term trade if there is a chance that he or she may face constraints on selling it subsequently.

Overall, the book manager typically strives more to identify assets that will produce relatively high book income (book yield) with a high degree of confidence (i.e., low default or prepayment risk) and less on anticipating monthly spread changes. This focus on book yield can often work to the advantage of the book manager. To the extent that a portion of a bond's yield reflect a risk premium to compensate total return managers for systematic spread volatility, the book manager can garner that additional spread because spread volatility does not impact the manager's performance.[10]

[10] For a discussion of this topic and how monthly spread volatility might affect a long-horizon manager's portfolio structuring, see L. Dynkin, J. Hyman, and B. Phelps, "Optimal Credit Allocation for Buy & Hold Investors," Journal of Portfolio Management, Summer 2004.

However, the book manager's long-horizon holding period means that the manager faces a very asymmetrical portfolio return profile. Asymmetrical returns increase as the investment horizon expands.[11] For credit assets in particular, long-horizon returns are very asymmetrical, since a bond either earns a narrow spread over Treasuries with high probability or loses a large fraction of its value with low probability.[12] Consequently, long-horizon investors typically try to maximize a bond's expected yield (or spread over funding) while minimizing the probability of experiencing a large loss (sometimes referred to as "tail risk"). Risk for a book manager is the risk is that a bond will fail to produce its promised book yield (or spread) because defaults (or prepayments) over the holding period exceeded the rate anticipated at purchase, producing lower than expected income (or spread). As discussed below, not only must the long-horizon investor worry about whether overall default rates are greater than expected, but also about whether issuer defaults in the portfolio are correlated. While the realized overall default rate in the market may equal the expected rate, the portfolio's default rate may exceed the market default rate if particular names in the portfolio default together.

[11] For a discussion on how the excess return distribution becomes more asymmetrical as the investor's holding period increases, see "A Quick Look at Index Tails," Global Relative Value, Lehman Brothers, Feb. 9, 2004.

[12] For securities that amortize depending on market movements, the comparable risk is that a premium amortizes faster or a discount amortizes slower than expected at purchase.

A book accounting benchmark allows a manager to directly compare the portfolio's historical book income with that of a passive portfolio. Has the manager been able to add additional book income? In addition, is the manager's portfolio likely to supply greater book income going forward as measured by the excess of the portfolio's book yield over that of the benchmark? Book accounting managers are constantly striving to add book yield to their portfolios. The benchmark's book yield and book income are an indication of what could be achieved if the manager followed a passive strategy. Surely, the manager will try to do better by adjusting the asset allocation mix, overweighting (underweighting) sectors that appear cheap (rich) and by adding issues of a given peer group that trade at a wider spread given their credit outlook. Often, the manager's book yield will excess that of the benchmark. But at what risk to future book income? Specifically, the manager must manage the risk that too much is lost through defaults and prepayments to erase any initial book yield advantage to the portfolio.

A book manager enjoying a book yield advantage over the benchmark may be taking risks that may not manifest themselves—in book accounting terms—for some time. What are these risks and how can they be quantified? To discuss this issue, consider the following hypothetical credit portfolio of a book accounting manager. We assume this manager received the following client investments and there were no client outflows:[13]

[13] The client may give the manager discretion to invest outside the investment-grade index which is assumed in this example. In addition, the client may give the manager discretion as to when to invest the client's investment inflows (i.e., the manager may wait for higher book yields).

The client has chosen to evaluate the manager against a book accounting index based on the Credit Index. In other words, the client will evaluate our manager versus a hypothetical manager who passively invests the client's investments in the Credit Index. Although the client has given the manager the discretion to hold onto bonds that leave the index due to downgrade, the manager's BOOKIN follows index rules and will remove downgraded bonds (sell at the market closing price and recognize any book gain/loss) from the BOOKIN.

A comparison of the manager's portfolio and BOOKIN at various dates since Dec. 31, 2003 is presented in FIG. 5, which shows that the manager invested the client's initial investment in a portfolio of investment-grade credits that produced a higher book yield (4.48%) versus the JAN04 Credit BOOKIN (i.e., Credit Index) book yield (4.32%). How did the manager accomplish this initial book yield advantage?

To investigate, we use the Global Risk Model to analyze the portfolio and its BOOKIN benchmark.[14] Why use the Risk Model, which measures normal monthly return volatility, to compare the manager? As discussed, the manager's risk is not the relatively symmetrical risk arising from short-term yield and spread volatility—as measured by the Risk Model—but the very asymmetrical credit risk arising from the probability of credit default. Although monthly volatility is not the best risk measure for a book manager, the Risk Model does help to identify the relative exposures in the portfolio versus the BOOKIN benchmark. In addition, we observe that many book managers prefer to monitor market portfolio returns versus the benchmark on a monthly basis as an early signal of potential problems. While the portfolio's book returns may be relatively stable versus the benchmark, the portfolio may begin to underperform on a market return basis. Persistent underperformance may foreshadow problems that appear after some time when reported on a book accounting basis.

[14] Lehman's book accounting index tools allow the manager to generate a list of CUSIPs and pars that comprise the BOOKUN benchmark which can be quickly impoited into POINT. For details on the Lehman Global Risk Model, interpretations of its various reports, and its portfolio applications, see to The Lehman Brothers Global Risk Model: A Portfolio Manager's Guide, April 2005.

FIG. 6 presents a comparison between the portfolio and BOOKIN benchmark. The manager initially invests in 33 issues from 27 different issuers. The portfolio is moderately longer in duration (and spread duration) which, given the steepness of the term structure at the time, accounts for some of the manager's book yield advantage. The duration difference is probably of small concern for the manager as long as any duration difference remains within tolerance limits (which we assume in this example). FIG. 6 also displays the estimated total monthly volatility of both the manager's portfolio and BOOKIN benchmark—as well as the components of that volatility. As seen, the manager's portfolio is expected to have more monthly return volatility than the benchmark.

To get a clearer picture of the manager's credit decisions we first examine a simple market structure report (FIG. 7). At a high level, we see that the manager chose to purchase a modest overweight to Baa/Ba bonds relative to the market, specifically bonds with longer duration and relatively higher book yields. For the higher qualities, the manager chose to hold shorter duration bonds with relatively lower yields. The manager is clearly making credit decisions to produce a higher portfolio book yield. What decisions did the manager make within each rating category? We can identify these decisions by examining the relative risk exposures between the portfolio and benchmark (FIG. 8).

FIG. 8 shows that the manager has some strong credit views. The portfolio has large net exposures (as measured by contribution to OASD) to the Baa-rated cyclical and communication sectors as well as an overweight to the A-rated communication sector. These sectors were characterized at the time by high yields relative to other sectors of similar ratings. The manager has chosen to underweight higher rated credits as well as sectors that have relatively lower yields (e.g., financials, foreign corporates and energy). In addition, the manager has overweighted the corporate liquidity factor indicating that the manager, as is common with many long-horizon investors, is overweight bonds that trade at wider spreads relative to bonds belonging to the same peer group. Also, the manager has an overweight to the corporate spread slope risk factor which shows that the manager was moving out the curve to pick up additional yield.

Not only does the manager's portfolio contain significant systematic sector views, but the portfolio is also concentrated in relatively few names (see FIG. 9). While this is unrealistic for most long-horizon investors, it will highlight the advantages of using a book accounting benchmark to evaluate the manager's performance. FIG. 9 shows that the manager has significant Baa-rated issuer exposures: F, GM, T, and MEX.

FIG. 10 completes the monthly volatility risk picture by calculating the overall monthly tracking error (43 bp/month) of the portfolio versus the BOOKIN benchmark. This report incorporates the correlations among the various risk exposures. The report also decomposes tracking error into systematic (and its various subcomponents), idiosyncratic, and credit default components. As shown, the portfolio has relatively little duration risk as the yield curve risk factors account for only 1.8% of the total tracking error variance. Instead, the portfolio displays strong credit views at both the sector (systematic) and issuer (idiosyncratic) level. We see that there are some very active exposures within the investment-grade sector (21% of the total tracking error variance), high-yield sector (6% of total variance—arising from a holding of a split-rated utility bond), and emerging markets (22% of total variance—arising from investment-grade holdings in UMS and PEMEX). Finally, FIG. 10 shows that the portfolio, given the relatively few issuers, has relatively high idiosyncratic risk (39% of total) contributing to tracking error volatility as well as default risk (9% of total).[15]

[15] The tracking error volatility due to default risk arises from the portfolio's particular exposure (net of the benchmark) to Baa-rated bonds as well as its holding of the split-rated utility bond. Note that default tracking error volatility measures the expected monthly tracking error volatility that may arise due to the probability of defaults. It is not a measure of the extreme losses that may occur in the portfolio relative to the benchmark in the event of defaults.

As discussed above, risk for book investors is not monthly tracking volatility versus a benchmark. Instead, the risk is that assets will fail to produce their promised income due to default or prepayment. In other words, will a portfolio of corporate bonds deliver their promised yield adjusted by the expected default and recovery rates at time of purchase? Or will actual (correlated) defaults over the holding period exceed the anticipated rate, producing a lower realized yield?

Long-horizon investors typically try to maximize expected book yield (or spread) while minimizing the probability of large portfolio losses ("tail risk"). Tail risk can be measured in several ways. One popular measure is "value-at-risk," or VaR, which is a level of losses from defaults expected to occur less than a specified percentage of time. For example, a 1% VaR of 500 basis points means that there is a 1% probability that losses in a portfolio will exceed 500 basis points. Another measure of tail risk is "expected shortfall," which is the average of all losses in the tail beyond the specified VaR level.[16]

[16] To encourage diversification in portfolios, investors typically try to minimize expected shortfall, rather than VaR, for a given level of yield (or spread). The advantages of minimizing expected shortfall as opposed to VaR is explained in "Coherent Risk Measures Applied to the Default Risk of Credit Portfolios and CDO Tranches," Fixed Income Quantitative Credit Research, Lehman Brothers, Jan. 31, 2002.

To measure a portfolio's probability of loss due to defaults, including the possibility of correlated defaults, one may use Lehman's portfolio tool, "COMPASS." COMPASS works as follows.[17] The investor supplies a list of credit bonds in the portfolio (e.g., CUSIPs and par weights) and specifies an investment horizon (e.g., 5 years). Each issue in the portfolio is then mapped to its issuer. Each issuer, in turn, is assigned to a market sector (e.g., industrial or consumer cyclical) and to a country (e.g., Japan or United States). Each issuer is also assigned a default rate depending on the issuer's credit rating. This default rate could be a historical cumulative default rate for the investment horizon, given the rating, as periodically published by the rating agencies, or it could be independently specified (e.g., by the investor). If the issuers were assumed to default independently of each other, then COMPASS would have enough information to simulate (via Monte Carlo simulation) the default loss distribution for the portfolio. However, as discussed earlier, not only does the investor run the risk that default rates may be greater than anticipated, but issuers may default in a correlated fashion. If so, then the possibility of large losses increases compared to the case where the default rate is the same, but defaults are uncorrelated. A key feature of COMPASS is the explicit incorporation of the possibility of correlated defaults in the simulation of portfolio losses.

[17] For details on the COMPASS portfolio tool, please see "COMPASS User Guide," July 2004, Lehman Brothers. For details on the theory and methodology underlying COMPASS please refer to "Modeling Credit: Theory and Practice," by Dominic O'Kane and Lutz Schlögl, February 2001, Lehman Brothers. Investors have used COMPASS to analyze portfolios containing not just credit but also ABS and CMBS assets. COMPASS also includes an optimizer. Consequently, the investor can specify a yield (or spread) target, a set of eligible bonds, various portfolio constraints (e.g., an issuer cap of 1.5%) and COMPASS will then optimize the portfolio by rebalancing bond positions, subject to the constraints, to minimize the portfolio's expected shortfall while satisfying the yield target.

COMPASS uses estimated historical equity market return correlations for the various sector-country pairs as estimators for default correlations between issuers from various sectors and countries.[18] Using default rates,[19] estimated default correlations and assumed recovery rates, COMPASS generates an expected loss distribution for the portfolio.

[18] Empirical evidence suggests that asset market returns (as well as other financial market returns) demonstrate "fat joint tails." In other words, the possibility of joint extreme realizations is empirically more likely than the probability implied by a joint normal distribution.

The implication of "fat joint tails" is that if defaults were assumed to be joint normally distributed, then the tail risk for the portfolio loss distribution would be understated. COMPASS includes a feature that allows the investor to specify a Student-t distribution (with user-specified degrees of freedom) when simulating the portfolio loss distribution to better fit the observed empirical pattern of "fat joint tails." We assume a t-distribution with 12 degrees of freedom.

[19] The assumed default rates are based on Moody's five-year cumulative corporate default rates over the 1988-2003 period. The assumed recovery rate is fixed at 35%. It is also possible to use COMPASS with downgrade probabilities in lieu of default probabilities.

Figure 11:
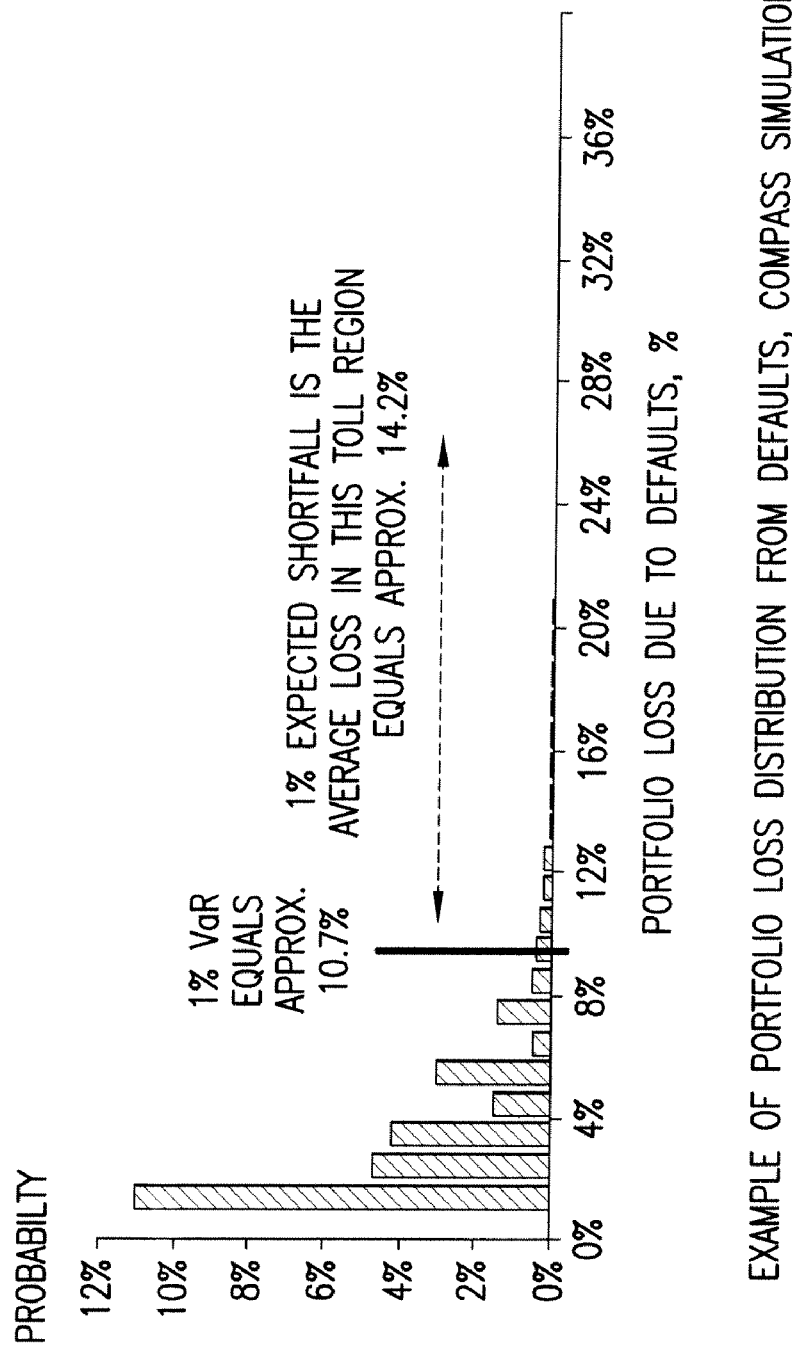
FIG. 11 shows simulated distribution of losses due to defaults for the manager's portfolio.

FIG. 11 shows the simulated distribution of losses due to defaults for the manager's portfolio over a five year horizon. The bulk of the portfolio's loss distribution lies between 1% and 7%, indicating that this is a moderate-quality investment-grade portfolio. 11% of the time the portfolio will experience a loss due to defaults over the horizon totaling 1% or less. The 1% VaR is approximately 10.7% which indicates that 1% of the time the portfolio is expected to experience losses due to defaults that exceed 10.7% of the portfolio's book value. The expected shortfall is the average of the losses that occur beyond this 1% VaR value of 10.7%. For this portfolio, the expected shortfall is approximately 14.2%.[20]

[20] In other words, this is the average loss conditional on the portfolio experiencing a loss in the 1% tail region.

As a comparison, we ran the manager's BOOKIN benchmark and measured its expected shortfall (1% tail) to be 10.2% —substantially less than the manager's portfolio. Although the manager has a book yield advantage, there is added risk as well, which is measured by the portfolio's expected shortfall relative to the benchmark. One possible risk-adjusted measure is to calculate how much book yield is generated per unit of tail risk. For the manager's portfolio we obtain 0.315 (=4.48%/14.2%) which compares unfavorably to the BOOKIN benchmark value of 0.424 (=4.32%/10.2%). On a risk-adjusted basis the manager is not adding value.

The Risk Model reports indicated that the portfolio was probably earning the higher book yield as a fair return for the added monthly total return volatility that the manager assumed relative to the benchmark. To the extent that the added yield reflects compensation required for total return managers to hold the assets due to their systematic spread volatility, and not compensation for default risk, then the book manager will earn this book yield advantage over time (via higher book income each period). However, as we saw from COMPASS, the manager was exposed to much greater risk of default than the benchmark. So the manager's book yield advantage needed to be scaled down to reflect this risk.

How did the manager perform? Over the next year and a half, none of the manager's assets defaulted. However, there was a downgrade (T) in July 2004. The downgrade prompted the manager to sell the bond, which required recognizing a book loss equal to the difference between the bond's book value and its market value at the end of July 2004. The book loss significantly reduced book income for the month. In addition, the manager re-deployed the proceeds into another asset that had a lower book yield. The BOOKIN suffered the downgrade as well (in addition to others) but the benchmark had lower exposure to such bonds. As a result, the benchmark suffered proportionally smaller book losses. The impact of the downgrade caused the portfolio's cumulative book income by year end 2004 to be less than that of the book benchmark despite having the higher book yield at the outset. Although not shown, the manager's book yield decreased about 2 bp.

Using Book Accounting Indices—Performance Comparison of "Book" and "Total Return" Managers Another advantage of having book indices is the ability to conduct quantitative empirical studies on various portfolio strategies. For example, suppose a book accounting client wishes to consider whether to have its assets managed by a traditional book accounting manager or a traditional "total return" manager. We make the following assumptions (which, of course, can be changed as desired):

The traditional "book" accounting manager follows a strategy of a relatively heavy concentration in spread product with relatively little trading activity. Alpha (versus a standard market benchmark) is generated over time from the spread product overweight and careful credit/prepayment selection which minimizes losses from credit events and prepayment shocks.

The traditional "total return" manager follows a strategy of active asset allocation, security selection, and yield curve timing. Correspondingly, the manager may trade actively. Alpha is generated from these active portfolio decisions.

How does the performance of these two managers compare on both a book accounting and market accounting basis? To answer this question meaningfully, it is important that we model both managers in a way that permits a fair comparison of their performance. In other words, the durations of both portfolios should be comparable over time. In addition, the book manager's portfolio should have a constant relative overweight (in percentage terms) to spread product over time. For example, if spread product currently makes up 60% of the Aggregate and the book manager's portfolio holds 72%, then this 20% overweight should be maintained over time. So, if ten years ago, the Aggregate contained 40% spread product, then we assume that the book manager held 48% of the portfolio in spread assets. We assume that:

- Both managers initialize their portfolios on Dec. 31, 1994, with an investment of $100 million. As a point of reference, the OAS for the Credit Index was 78 bp on Dec. 31, 1994, versus 75 bp as of Dec. 31, 2004.
- The book manager buys a portfolio that is overweighted to spread product but is initially duration-matched to the Aggregate. Along with the initial spread product overweight, the book manager is a passive investor. The manager just re-invests cash generated by the portfolio so as to maintain duration neutrality (if possible) and a spread product overweight.
- The total return manager buys the Aggregate (i.e., no spread product overweight). However, the total return manager makes active decisions each month that produce outperformance versus the Aggregate. We assume the total return manager holds the Aggregate with an overlay that produces a variable alpha that is positive on average. To make the contrast between a book and total return manager more realistic, we assume the total return manager turns over the portfolio x % per month. For this report we assume x %=5.6% (or 50% turnover per year[21]). Any turnover cost is covered by the manager's alpha.

[21] We define "survival" as 1−turnover. If we assume that yearly survival=(monthly survival)^12, and we desire a yearly turnover of 50%, we conclude that monthly turnover=1−((yearly turnover)^(1/12))=1−(0.5^(1/12))=5.6%.

- No external investment inflows/outflows occur after the initial date. Neither manager is asked to sell assets to generate an outflow or to realize a gain or loss. Each manager's portfolio is rebalanced (as discussed below), at the end of every month.
- All cash flows generated by a portfolio are reinvested at contemporaneous yields.
- Assets that are downgraded below investment-grade are sold (at market) out of both portfolios on the earliest possible rebalancing date (i.e., at the end of the month in which they are downgraded). While there are some book and total return managers that hold downgraded bonds, we assume that both managers follow index conventions.

Traditional "Book" Accounting Manager

Every month, the book manager calculates target allocations to these five asset classes: Treasuries, ABS & CMBS, Credit, MBS and agencies. The target allocations are designed to maintain the manager's relative overweight to spread product over time. Within the allocation to spread product, the allocation across the four spread asset sectors is constant over time.

We assume that the book manager never sells assets for the purpose of meeting target allocations, so the target allocations may not always be exactly met. However, when any cash flow becomes available, the book manager always moves the portfolio's allocation as close to the target allocation as possible.

We assume there is always a target overweight of 19.7% to the four spread product classes relative to the Aggregate. For example, as of Dec. 31, 1994, spread sectors comprised 53.0% of the Aggregate. So the book manager's total target allocation to spread product is 53.0%+(19.7%×53.0%)=63.4%. The target overweight is set to 19.7% so that the allocation to Treasuries will be exactly 10% as of Jan. 31, 2005 based on the assumption that a book manager would probably hold 10% UST in a portfolio today. Since the percentage of spread product in the Aggregate has changed so much over time, this method ensures that the book manager is making the same relative magnitude spread overweight decision throughout the period of the study. The target allocation to each of the four spread product classes is always a fixed fraction of the total allocation to spread product as follows: ABS+CMBS: 1/9, Credit: 4/9, MBS: 1/3, Agency: 1/9.

FIG. 12 shows the book manager's allocation to spread product as of Dec. 31, 1994. Note that the book manager's portfolio, despite the overweight to spread product in general, has an underweight to MBS (21.2% vs. 28.9%) and an overweight to credit (28.2% vs. 16.0%) relative to the Aggregate. This seems fairly typical of book managers. There is also a large overweight to ABS (the Aggregate did not yet contain CMBS) and a smaller overweight to agency product.

As discussed, the book manager has a 19.7% overweight to spread product (63.51%/53.06%=1.197). It is interesting to note that although the book manager has an overweight to spread assets, the yield on the spread portfolio is slightly less than the yield for the spread sector of the index. This is due to the relative weighting scheme within spread product (i.e., overweight credit and underweight MBS). Consequently, it is possible that the overall yield on the book manager's portfolio may be close to or less than that for the index. (This is indeed the case.) However, this is a consequence of the yield calculation for MBS which does not take into account the optionality of the MBS security. As most managers will use OAS as opposed to yield to measure the potential spread contribution of MBS, we report the spread sector OAS for both the index and the book manager. As discussed above, the book manager definitely has a spread overweight versus the index (41 bp versus 33 bp).

To illustrate that we are carefully maintaining a constant spread overweight strategy for the book manager, FIG. 13 shows the same information as FIG. 12 but as of Dec. 31, 2004. Again, note the overweight to credit (40.1% versus 24.8%), the underweight to MBS (30.1% versus 35.1%) and the higher OAS of the book manager's portfolio as compared to the Aggregate's (47 bp versus 33 bp).

How does the book manager adjust the portfolio's allocation each month? At month-end, the portfolio market value equals the market value of all the bonds in the portfolio plus the amount of cash earned by the portfolio in the past month. An asset class's target market value equals the portfolio market value multiplied by the class's target allocation.

If the class's target market value exceeds its current market value, the manager will use some of the cash earned by the portfolio in the past month to purchase, on a market weighted basis, all bonds in the Aggregate as of that date that belong to the asset class.

For example, suppose on Jan. 31, 2000, the total market value of the portfolio's existing assets is $99.5 million and the portfolio generated $500,000 in cash flows during Jan. 2000, so the portfolio market value is $100 million. Suppose also that the market value of agencies currently in the portfolio is $8.2 million. If the target allocation to agencies on this date is 9%, then the target market value for agencies is $9 million and the manager will use some of the $500,000 to buy the agencies currently in the Aggregate on a market-value weighted basis (although in this example he or she will clearly not be able to reach the target market value of $9 million). If, however, the target allocation to agencies is 8%, then the target market value will be less than the market value of the existing agencies and the manager will neither buy nor sell agencies.

There may or may not be enough cash available to bring all the asset classes to their target market values. If there is insufficient available cash, the cash is allocated to the assets requiring an increase in MV on a pro rata basis based on the size of the desired increases. In the previous example, if the target allocation for agencies is 9%, then the agencies are $800,000 shy of their target market value before rebalancing. If the only other asset requiring an increase is MBS, and it is $200,000 short of its target market value, then of the $500,000 in cash available, $400,000 will go towards agencies and $100,000 will go toward MBS.

If new Treasuries are bought for the portfolio, then the set of Treasuries in the Aggregate as of that date is divided evenly into a long set and a short set, and a mix of the long and short sets is purchased with the goal of making the overall portfolio duration as close as possible to the duration of the Aggregate as of that date. (This is important because the total return manager is assumed to match the Aggregate's duration as well. To permit an accurate performance comparison of the book and total return managers, we must constantly adjust the book manager's duration to closely track the Aggregate.) The long and short sets are constructed by examining the durations of every Treasury in the Aggregate and using the median of those durations as the dividing line between the two sets. We assume that the book manager will not sell assets for the purpose of meeting the duration target even if no Treasuries are being purchased or it is impossible to meet the duration target with a combination of the long and short Treasuries.

Traditional Total Return Manager

The total return manager rebalances the portfolio every month so that its holdings exactly match those of the Aggregate. (The total return manager's alpha generation will be factored in later.) Unlike the book manager, the total return manager will sell assets if necessary to achieve the portfolio's allocation goals. Also, to make for a more realistic comparison of book and total return managers, we assume the total return manager produces turnover of x % per month (initially set at 5.6%, equivalent to 50% per year). Turnover will affect the book yield and book income of the portfolio relative to the book manager. Results are presented with and without this turnover feature.

Each month, the total return manager calculates how much (in dollars of market value) of the portfolio's existing holdings must be sold. This amount is the greater of:

Turnover, i.e., 5.6% of the market value of existing holdings, if turnover is assumed; and The amount that must be sold so that the proceeds of the sale, combined with cash generated by the portfolio in the previous month including cash generated by redemptions and sales of existing issues, will be enough to buy a position in the new issues in the Aggregate that will make the portfolio match the Aggregate exactly (in terms of percentage of market value allocated to each security).

If turnover is not assumed, and enough cash was generated in the previous month to acquire a sufficiently large position in the index's new issues without selling any existing holdings, then no existing holdings will be sold.

The manager will take the proceeds of the sale (if any) and the cash generated in the previous month and buy a position in the new issues in the Aggregate that will make the portfolio match the Aggregate exactly. If there is any cash left over, it is invested in the full index.

When selling existing assets, the total return manager sells a portion of each prior purchase lot on a pro rata basis. Suppose, for example, that as of Feb. 28, 1995, the manager's investment in the Dec. 31, 1994 Aggregate is now worth $98.5 million, the manager's investment in the Jan. 31, 1995 new issues is now worth $0.5 million, and the investment in the Jan. 31, 1995 full index is now worth $1 million, so the portfolio's holdings are worth $100 million. Suppose also that the manager needs to sell $100,000 worth of assets in order to have enough money to put into new issues. We assume that the manager sells $98,500 worth of the Dec. 31, 1994 Aggregate (which constitutes 98.5% of the portfolio's existing holdings), $500 worth of the Jan. 31, 1995 new issues (which constitutes 0.5% of existing holdings), and $1,000 worth of the Jan. 31, 1995 full index (which constitute 1% of existing holdings).

Once the total return manager's analytics have been calculated based on this strict index-tracking method, the portfolio's book income and monthly increases in book value and market value are inflated using a normally distributed alpha with an annualized mean (after fees) of 30 bp and annualized standard deviation of 60 bp for a very respectable information ratio of 0.5. These particular parameters, of course, can be easily changed.

Results

Performance results are presented in FIG. 14. In terms of market value performance, the total return manager with 30 bp of annual alpha clearly outperforms the book manager. Interestingly, the total return manager's relative annual outperformance equals 22.8 bp (=12×(65.7 bp/month—63.8 bp/month). Not only is this greater than zero, but it is close to the manager's 30 bp of expected annual alpha.[22] However, on a simple risk-adjusted basis (mean divided by standard deviation), the two managers perform similarly (0.59 vs. 0.59).

[22] The total return manager's realized alpha in our simulation was 37.7 bp with a standard deviation of 59.4 bp.

Interestingly, with an alpha of zero (and a standard deviation of zero), the total return manager performs slightly worse than the book manager (62.6 bp/month vs. 63.8 bp/month) and with a higher standard deviation. Due in large part to the total return manager's turnover, the ending book yield (4.40%) is substantially below that of the book manager (5.59%). The book income manager's cumulative book income exceeds that of the total return manager by $2,528,280 by Dec. 2004. If we ignore turnover, results for the total return manager are presented in FIG. 15.

Obviously, the results presented above depend heavily on the underlying assumptions. The book manager has a relatively modest spread overweight. Perhaps there is a more significant overweight to Baa-rated bonds and a greater ex-ante spread advantage? Also, the total return manager has a very strong information ratio. Nevertheless, the availability of book accounting indices now permits quantitative analysis of alternative portfolio strategies for book accounting investors.

Since a BOOKIN's performance in a given performance month depends on its vintage month, results are presented in a table. For example, the book yield for the Lehman Aggregate BOOKIN would be presented as follows (see Table 1):

TABLE 1

Aggregate BOOKIN (various vintage months)
Presentation of Performance Numbers

|  |  | Performance Month | | | | | | | |
|---|---|---|---|---|---|---|---|---|---|
|  |  | JANUARY 2001 | FEBRUARY 2001 | MARCH 2001 | APRIL 2001 | MAY 2001 | JUNE 2001 | JULY 2001 | AUGUST 2001 ... |
| Vintage Month | JANUARY 2001 | x | x | x | x | x | x | x | x |
|  | FEBRUARY 2001 |  | x | x | x | x | x | x | x |
|  | MARCH 2001 |  |  | x | x | x | x | x | x |
|  | APRIL 2001 |  |  |  | x | x | x | x | x |
|  | MAY 2001 |  |  |  |  | x | x | x | x |
|  | JUNE 2001 |  |  |  |  |  | x | x | x |
|  | JULY 2001 |  |  |  |  |  |  | x | x |
|  | AUGUST 2001 |  |  |  |  |  |  |  | x |
|  | ... |  |  |  |  |  |  |  |  |

For a given vintage year BOOKIN, the following statistics preferably are reported each performance month:

1. Book yield$_t$
2. Book income$_t$[23]
3. Book value$_t$
4. Book Return$_t$ (=Book Income$_t$÷Book Value$_{t-1}$), and
5. Amortization Amount$_t$ Also reported is the total market return for each vintage BOOKIN:

6. Total market return.

[23] At least one embodiment also reports attribution of monthly changes in Book Yield and Income (e.g., how much is due to reinvestment of cash flow, restatement of MBS prepayments, credit impairments, etc.) on both a before-tax and after-tax basis.

In addition, some select summary statistics for each vintage BOOKIN preferably also are reported each performance month:

7. Duration$_t$ (market value weights)
8. Convexity$_t$ (market value weights)
9. OAS$_t$ (market value weights)
10. Average credit quality$_t$ (market value weights)
11. Basic credit quality distributions$_t$: Aaa/Aa, A, Baa (market value weights), and
12. Basic sector distributions$_t$: TSY, AGY, CREDIT, MBS, ABS, CMBS (market value weights).

DEFINITIONS & CALCULATIONS

Monthly statistics for BOOKIN indices are calculated according to standard book accounting methodologies. However, as there is discretion in the way various accounting regulations can be interpreted, and as an index must follow a strict set of rules, there is no assurance that BOOKIN statistics will precisely reflect statistics calculated by an accounting entity.

As discussed above, generally speaking, when a book accounting investor buys a bond, he records its purchase price and yield (bond-equivalent yield). This yield is the bond's book yield. For each month thereafter, the investor records "book income" for the bond based on this book yield at purchase and also the book return (=book income divided by beginning-of-month book value). Each month the investor will adjust the book price to reflect amortization of any premium or discount since purchase.

Presented below are details of a preferred BOOKIN book accounting methodology.

DEFINITIONS $P_t$=clean market price of bond at time t.
$P_0$=purchase price of bond at time 0.
$CurrF_t$=outstanding "current face" at time t: $CurrF_t$=$CurrF_{t-1}$−$PD_t$. For non-MBS, current face means par amount.
$CurrF_0$=initial holding of current face
$PD_t$="paydown:"
Cpn=coupon rate on bond=annual coupon rate/12.
$StdInt_t$="stated interest"=$CurrF_{t-1}$×Cpn (adjusted for the monthly time period interval)
$BkInc_t$="book income"=$BV_{t-1}$×$BkY_{t-1}$ (adjusted for the monthly time period interval)
$Amort_t$="amortization"=$BkInc_t$−$StdInt_t$
$RemAmort_0$=−($P_0$−100)×$CurrF_0$=−$Prem_0$×$CurrF_0$
$RemAmort_t$="remaining amortization:"$RemAmort_{t-1}$−$Amort_t$
$BV_t$="book value" of position at time t
→$BV_t$=$CurrF_t$−$RemAmort_t$
$BV_0$=$P_0$×$CurrF_0$ (initial "book value")
$BkP_t$="book price"=$BV_t$/$CurrF_t$
$BkP_0$=initial "book price"=$BV_0$/$CurrF_0$=$P_0$
$BkY_0$="book yield" (ytm/ytw) at purchase
→for non-MBS=ytm at time 0
→for MBS: yield calculated using $P_0$ and $PSA_0$.
$Prem_t$="premium:" $P_t$−100. Note, for discounts, Prem <0.
$CashFlow_t$=$PD_t$+$StdInt_t$
$BkRet_t$="book return:" $BkInc_t$/$BV_{t-1}$=book income in period t divided by book value at the end of last period. $BkRet_t$ for the BOOKIN will be a weighted BkRet where the weights are $BV_t$.
$PSA_t$=[for MBS] long-term assumed prepayment speed for MBS at time t. (Use PC Product field "PSAYldEqv".)
$PSA_0$=[for MBS] initial long-term pricing assumption for MBS at time 0.
$F_t$=[for securitized] fraction of initial current face outstanding at time t (i.e., the "factor"). $F_0$=1
Note: $CF_t$=$F_t$×$CF_0$
→$F_t$ is calculated using WAC, WAM, and SMM (see separate worksheet)
$S_t$=[for securitized] fraction of current face at time t−1 surviving to time t=$F_t$/$F_{t-1}$. $S_0$=1

$(1-S_t)$=[for securitized] fraction of current fact at time t−1 not surviving to time t.

$PD_t$=[for securitized] paydown amount at time $t=(1-S_t) \times CF_{t-1}$. For all other securities, $PD_t=0$.

Calculations:

General Case:

Book Yield (BkYld): A bond's book yield equals its bond-equivalent yield at time of purchase. For BOOKINs, the time of purchase is defined as the beginning of the vintage month. So, the book yield reported for the JAN04 Aggregate BOOKIN equals the book value weighted book yield for all the bonds in the Aggregate Index at the beginning of January 2004.

Book Value (BV): A bond's book value equals its market price (plus accrued) at time of purchase. Over time, the bond's book value may change. For bonds purchased at a premium (above par), the premium amount must be amortized over the bond's life. Consequently, the bond's book value will decline over time (each month declining by the amortization amount) until the bond's book value equals par at maturity. Similarly, for bonds purchased at a discount (below par), the discount amount must be amortized over the bond's life so that at maturity the bond's book value will equal par.[24]

[24] Preferably BOOKINs do not give special accounting treatment for OID bonds.

Generally, a bond's book value changes very gradually if at all. However, there are some special cases where a bond's book value (and its book yield) can change significantly from month to month. These events are usually associated with a change in the prepayment assumption for MBS and with a credit impairment for credit-risky bonds. These situations are discussed in greater detail below.

Book Income (BkInc): Book income equals the bond's book yield for the performance month multiplied by the bond's prior month book value.

Book Return (BkRet): Book return equals the bond's book income for the performance month PLUS any adjustments (if needed) to the prior month's book income (discussed in the special cases below) PLUS any final adjustments to a bond's final book value.

For non-defaulting bullet bonds (i.e., bullet U.S. Treasuries) these calculations are straightforward. FIG. 16 presents an example.

A 5-year 6% Treasury bond (1,000,000 par) is purchased at a price of 103. The 3% premium (or, $30,000) must be amortized over the five years. At purchase, the yield was 5.30%. This is the BkYld for the bond. Each period (for simplicity we assume annual periods), the bond receives 6% stated interest (StdInt) of $60,000. The BkInc is the BkYld×$BV_{-1}$. So, at the end of period 1, the bond has a BkInc of $54,603 and StdInt of $60,000. The difference of $5,397 is the period's amortization amount of the initial $30,000 premium.

For the first period, BkYld equals BkInc divided by $BV_{-1}$=5.30%, as expected.

However, for other bonds (especially securitized and credit-impaired bonds), these calculations may become more involved. Those skilled in the art will understand how to adapt the methodology described herein for such other bonds, and will recognize that such adaptations fall well within the scope and spirit of the invention described herein.

We now discuss some special cases.

Special Case 1: MBS. BV and BkYld are a Function of Expected Prepayment Speed.

Mortgage-backed securities (MBS) are a special case. If the actual prepayment experience and/or forecast of prepayments going forward differ from that assumed in the initial vintage month, then BkYld must be recalculated (i.e., retrospective yield method). The recalculated BkYld will produce a revised BkInc in each month following the vintage month. Although prior BkInc values are not restated, the BkYld (and RemAmort) in the current performance month is adjusted to reflect BkYld adjustments required for all of the prior months.

Figure 17:
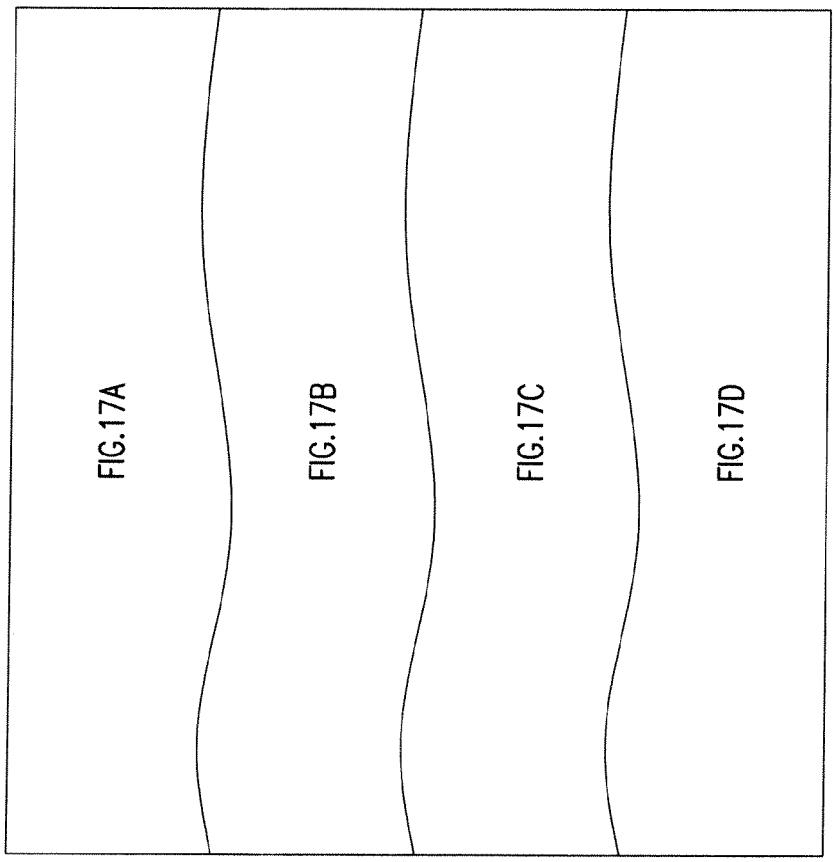
FIG. 17 depicts a spreadsheet showing book accounting for MBS.

A helpful example is shown in the spreadsheet depicted in FIG. 17. Suppose at time 0 we buy 1,000,000 current face of FNMA 6% (360 wam) at a price of 103. Initially, the factor is 1.0000. The amount of premium to be amortized is $30,000. The initial book value, $BV_0$, is $1,030,000. At the time of purchase, the pricing PSA value, $PSA_0$, was 500. (Use the PC Product field "PSAYldEqv"[25]).

[25] The PSAYldEqv is the long-term PSA rate that causes the bond's yield along the zero-volatility Treasury curve to equal the yield produced using the same zero-volatility curve and the full MBS prepayment model.

Figure 18:
FIG. 18 is a table depicting book accounting for an impaired credit bond.

Using $P_0$ and $PSA_0$, we calculate an IRR of 5.33%. This is $BkY_0$. If actual paydowns are as expected (based on $PSA_0$), then the annual book return on the holding each period will equal BkY. Assuming $PSA_0$ we can construct a table showing anticipated values for Amort, BkInc, StdInt, etc. Let's call this the "BkY Amort Schedule." This is Part 1 of FIG. 18.

Now suppose reality turns out to be different from what was expected. Paydowns are much slower (i.e., $75,000) than expected ($100,000) (see Part 2 of FIG. 18). At the end of period 3 suppose we face reality and recognize that there is a new long-run prepayment projection, $PSA_{TnewPSA}$. We must calculate a revised $BkY_{TnewPSA}$, $BV_{TnewPSA}$, etc., to reflect this new information. The procedure is as follows:

(a) Calculate a new $BkY_{TnewPSA}$ using $P_0$ and $PSA_{TnewPSA}$ as if you were back at time 0. To calculate $BkYT_{newPSA}$ repeat the following mantra: "If I knew then what I know now . . . " In other words, to calculate $BkY_{TnewPSA}$ use the actual PDs up to time $t_{TnewPSA}$ and the revised projected PDs going forward. Let's call this exercise generating a "Test Amort Schedule." This is Part 3 in FIG. 18. We calculate the new book yield, $BkY_{TnewPSA}$, to be 5.428%.

(b) The new $BkY_{TnewPSA}$ will be the new book yield going beginning with period $t_{TnewPSA}$.

(c) We now have to generate the "Rev BkY Amort Schedule." This is Part 4 in FIG. 6. Although your new Test Amort Schedule generates new values for Amort, BkInc, BV, RemAmort, and BkY up to time $t_{TnewPSA}$, there is no restatement of prior results. So, take values from the prior BkY Amort Schedule, up to but not including, time $t_{TnewPSA}$ for: Amort, BkInc, BV, RemAmort, and BkY.

(d) Always keep in mind that PDs, Cash Flow, StdInt, CurrF, and F always reflect reality.

(e) So, at time $t_{TnewPSA}$ we need to calculate values for Amort, BkInc, RemAmort, BV and BkY.

a. Time $t_{TnewPSA}$ values for BV, BkY, and RemAmort come from the time $t_{TnewPSA}$ values from the Test Amort Schedule b. Time $t_{TnewPSA}$ value for BkInc equals $$BkInc = BkY_{TnewPSA} \times BV_{TnewPSA-1} + \Sigma(BkInc(\text{from Test Amort Sch}) - BkInc(\text{from prior BkY Amort Sch}))$$

(the summation is over periods prior to time $t_{TnewPSA}$).

c. Time $t_{TnewPSA}$ value for Amort equals the difference between the revised BkInc and the StdInt.

(f) Continue as usual going forward using $BkY_{TnewPSA}$.

As we see from the above, a key assumption is how often a revised BkYld is calculated. A preferred BOOKIN methodology assumes that the BkYld is recalculated each month.[26]

[26] The frequency of recalculation is likely to vary from investor to investor. The BOOKIN methodology preferably uses the PSAYldEqv (the long-term PSA rate such that the static yield of the MBS produces a price equal to its current price) as the forecast for future prepayments. PSAYldEqv is the value as reported by the Lehman Family of Indices. Other investors may use other prepayment forecasts which may cause their book accounting values to differ from BOOKINs.

Special Case 2: Credit "Impairment" of Credit-Risky Bonds. Adjustment of BkYld.

The preferred BOOKIN methodology defines a bond downgraded below investment-grade[27] as an "impaired" bond.[28] We assume such a bond is sold from the BOOKIN

[27] As defined by the Lehman Family of Indices.
[28] Investors and their accountants may follow another definition of impairment. It may be possible to design customized BOOKINs that will reflect an investor's particular impairment definition. at the end of the month that the bond is impaired. When the bond is sold (at the Lehman Index month-end price plus accrued) the sale proceeds are recognized as the final cash flow. As with the MBS, we follow these steps:

1. Go back to the purchase date and recalculate the bond's book yield, following the rule that "If I knew then what I know now . . ."
2. Recalculate the BkY Amort Schedule.
3. Time $t_{DG}$ value for BkInc equals $$BkInc = BkY_{tDG} \times BV_{tDG-1} + \Sigma(BkInc(\text{from Test Amort Sch}) - BkInc(\text{from prior BkY Amort Sch}))$$

(the summation is over periods prior to time $t_{DG}$).
The term added to book income, $$\Sigma(BkInc(\text{from Test Amort Sch}) - BkInc(\text{from prior BkY Amort Sch}))$$

can be shown to equal $$BV_{tDG-1}(\text{from Test Amort Sch}) - BV_{tDG-1}(\text{from prior BkY Amort Sch}).$$

The Test Amort Schedule causes a downward revision of $BV_{tDG-1}$ because it takes the impairment into account whereas the prior BkY Amort Schedule does not. Thus we can think of $$BV_{tDG-1} (\text{from Test Amort Sch}) - BV_{tDG-1} (\text{from prior BkY Amort Sch})$$

as the write-down due to the impairment.

Special Case 3: Callable (non-MBS) Bonds. BkYld is a Function of Yield to Worst at Time of Purchase.[29]

[29] A strict interpretation of GAAP would require that BkYld be calculated using the bond's maturity. For premium priced bonds this would tend to overstate the bond's BkYld compared to the preferred BOOKIN methodology. If such a bond were then called, there would be a write-down of the bond's remaining amortization. Statutory accounting rules for insurance companies require that a callable bond's yield to worst be used for its BkYld which will tend to produce a more conservative book yield.

Another special case is callable (non-MBS) bonds. The BOOKIN methodology preferably amortizes a callable bond's premium or discount using the bond's yield-to-worst. The BOOKIN methodology preferably assumes the bond will remain outstanding until the call or maturity date implied by the bond's yield-to-worst at time of purchase.

For bonds trading at a discount at time of purchase, the yield to worst generally implies that the bond is expected to remain outstanding until maturity. BOOKINs assume that the bond's yield-to-worst is the bond's book yield and will remain so until the bond is called or matures.[30] At the implied maturity date, any premium or discount net of the call price will be fully amortized.

[30] Again, this is the BOOKIN methodology which is closely following statutory accounting practice for insurance companies. Other investors may employ a different methodology. For example, banks may follow GAAP, which requires a callable bond's book yield to equal its yield-to-maturity irrespective of whether the bond is purchased at a premium or a discount. The BOOKIN methodology may be adapted to future accounting regulatory developments.

For bonds trading at a premium at time of purchase, the yield-to-worst generally implies that the bond is expected to be called prior to maturity. Again, BOOKINs assume that the bond's yield-to-worst is the bond's book yield the bond will remain outstanding until the implied call date. Until the implied call date, the bond's book yield will remain constant. At the implied call date, any premium or discount net of the call price will be fully amortized. If the call date arrives and the bond is not called as anticipated, then we calculate the bond's new book yield. There are two scenarios.

A. If the bond remains currently callable at par after the "missed" call date then the bond's book yield equals the bond's stated coupon rate. Since, in this case, stated interest equals book income, there is no further amortization.

For example, suppose an investor buys a 6% coupon bond with 5 years remaining to maturity but is callable at par in 2 years. The investor buys the bond at a premium (5% yield to worst (call date)). The bond's book yield equals 5% and we assume the bond is called at its call date. If the bond is not called at this date, but remains callable until its maturity date, the bond's book yield becomes 6%. The "prospective" yield method will be used: there will be no adjustment of this period's book income as a result of using a different book yield up to this date.[31]

[31] Note that the retrospective book yield methodology for MBS preferably is not used for callable bonds. In other words, the book yield for callable bonds is not recalculated each month.

B. If the bond is no longer currently callable after the missed call date but has additional future fixed call dates (in addition to its final maturity date), then the date implied by the bond's new yield-to-worst (calculated using the bond's current book price) is the new assumed final outstanding date for the bond.

For example, suppose an investor buys a 7% coupon bond with 5 years remaining to maturity but is callable at 100.5 in 2 years and at par in 3 years. The investor buys the bond at a premium with a 5% yield-to-worst, implying the bond will be called at its 100.5 call date). The bond's book yield equals 5% and we assume the bond is called at its first (100.5) call date. If the bond is not called at this date, the bond's new yield-to-worst will be calculated. If the new yield-to-worst (calculated using the bond's 100.5 book price) implies the bond's next call date, then the bond will again be treated as a callable bond. If the bond's yield-to-worst implies the bond's maturity date, then we assume the bond will remain outstanding until maturity. The "prospective" yield method will be used: there will be no adjustment of this period's book income as a result of using a different book yield up to this date. If the bond is called prior to maturity, then any remaining amortization will be recognized as a gain/loss on the call date.

Suppose at time 0 (i.e., the vintage month) we buy $1,000,000 current face of a 6% callable corporate bond at 103. This is a 5-year maturity bond, callable at 100.5 at the end of year 2 and callable at par at the end of year 4. The amount of premium to be amortized is $30,000. The initial book value, $BV_0$, is $1,030,000. At the time of purchase, the market is pricing the bond to the premium call which produces a yield-to-worst of 4.6392%. (Note: yield-to-maturity is 5.3013% and yield to the par call is 5.1510%.)

Using $P_0$, and assuming the bond will be called at year 2, we calculate a yield of 4.6392%. This value is $BkY_0$. The purchase premium is amortized over the time remaining until the call date—two years. Assuming call in year 2, we can construct BkY Amort Schedule showing anticipated values for Amort, BkInc, StdInt, etc. This is Part 1 in FIG. 19.

Figure 19:
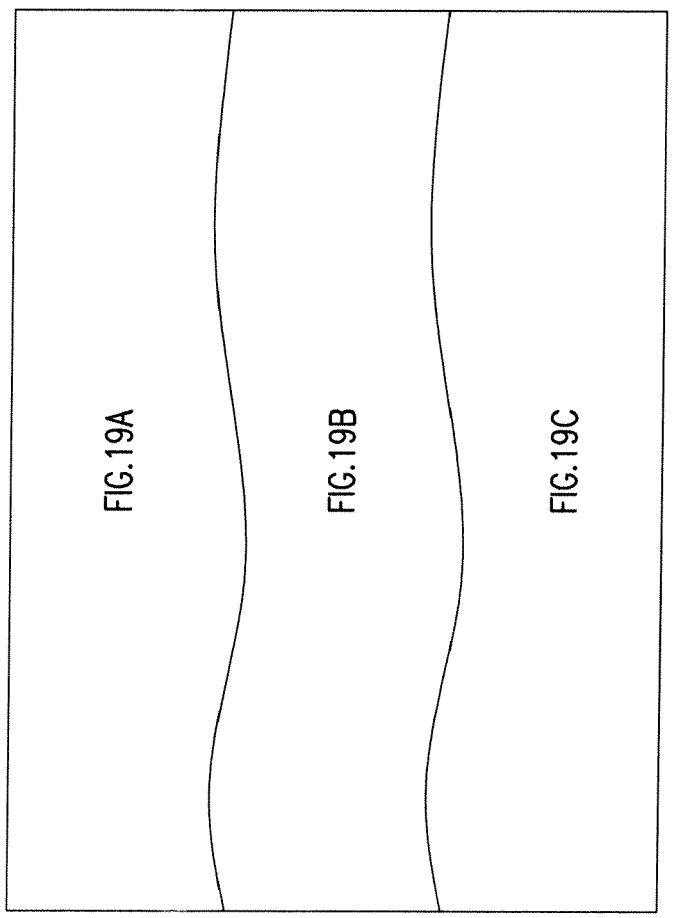
FIGS. 19 and 20 depict book accounting for callable bonds.

Now suppose at the end of period 2 the bond is not called (Part 2 in FIG. 19). Note that the bond's book price is 100.5 (i.e., BV=1,005,000). Using this book price we calculate the bond's yield-to-worse: par call (5.7280%) or maturity (5.8136%). Since the yield-to-worse is to the par call, we now assume the bond will amortize its remaining premium ($5,000) to the par call date using a book yield of 5.7280% (Part 3 in FIG. 19).

As another example, suppose at time 0 (i.e., the vintage month) we buy $1,000,000 current face of a 6% callable corporate bond at 103. This is a 5-year maturity bond, callable at 100 at any time after the end of year 2. The amount of premium to be amortized is $30,000. The initial book value, $BV_0$, is $1,030,000. At the time of purchase, the market is pricing the bond to call which produces a yield-to-worst of 4.40%. (Note: yield-to-maturity is 5.3013%.)

Using $P_0$, and assuming the bond will be called at year 2, we calculate a yield of 4.40%. This value is $BkY_0$. The purchase premium is amortized over the time remaining until the call date—two years. Assuming call in year 2, we can construct BkY Amort Schedule showing anticipated values for Amort, BkInc, StdInt, etc. This is Part 1 in FIG. 20.

Figure 20:
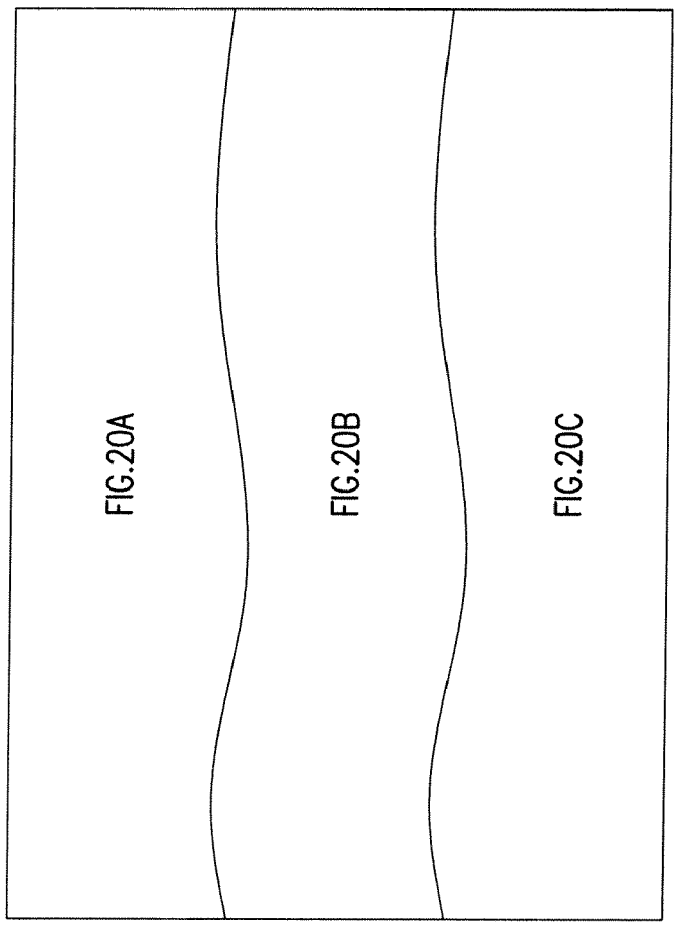

Now suppose at the end of period 2 the bond is not called (Part 2 in FIG. 20). Note that the bond's book price is 100 (i.e., BV=1,000,000). Going forward, we use the bond's coupon rate as its book yield (i.e., 6%). Since stated interest equals book income there is no amortization. We continue to use the 6% book yield until the bond is called or matures. The "prospective" yield method will be used: there will be no adjustment of this period's book income as a result of using a different book yield up to this date.

Special Case 4: ABS and CMBS Bonds. BV and BkYld are a Function of Projected Paydowns.

ABS and CMBS bonds are another special case. These bonds share some important characteristics with MBS (i.e., prepayments) and some important differences (i.e., tranche structures such as lock-outs). For each ABS and CMBS bond (i.e., tranche) in the LEH indices, the LEH Analytics Group produces a vector of projected monthly cash flows based on the zero-volatility Treasury curve and the relevant prepayment model. The BOOKIN methodology then recalculates the BkYld for the bond, in keeping with the "If I knew then what I know now" motto, based on:

The vector of projected remaining cash flows;
Realized prepayments (if any) since the vintage month; and
The price in the vintage month.

The recalculated BkYld will produce a different BkInc in each subsequent month. Although prior BkInc values are not restated, the BkYld and RemAmort in the current performance month are adjusted to reflect BkYld adjustments required for all of the prior months. This methodology is very similar to that used for MBS.[32]

[32] Sinkers will also be handled in a similar manner.

Measuring Portfolio Performance Using BOOKINs

How can a book accounting investor use BOOKIN as a performance benchmark?

For example, how can a book accounting investor use the Lehman US Aggregate BOOKIN as a performance benchmark? The pure passive strategy for the investor would be to buy all the bonds in the Aggregate Index at the beginning of the month that the assets are invested (i.e., the vintage month). The investor would then hold on to the bonds. Any cash flow generated by the portfolio would be reinvested into all the bonds in the Aggregate Index contemporaneous with the cash flow.

If the investor has only a single initial investment to make, then the performance benchmark is simply the Aggregate BOOKIN whose vintage month corresponds to the initial investment month.

Suppose the investor makes an initial investment (say, JAN01), but some time later (say, APR01) makes another investment. Up to FEB02, the investor's performance benchmark is the Aggregate JAN01 BOOKIN. Beginning in APR01, the investor has a "composite" BOOKIN benchmark equal to a combination of the Aggregate JAN01 BOOKIN and the Aggregate APR01 BOOKIN. The weights for the Composite BOOKIN are the current book value weights of the two investments. For example, if the initial JAN01 investment was $1,050,000, the book value of that investment as of the beginning of APR01 was $1,000,000, and the investment at the beginning of APR01 was $500,000, then the two weights for the performance months beginning in APR01 are 0.67 and 0.33, respectively.

The composite index can be constructed by pre-multiplying the BOOKIN matrix of BkYld (or BkInc or another statistic) by the row vector of investment percentages. The last entry in the resultant row vector will correspond to the desired statistic. See FIG. 21.

FIGS. 22-25 depict sample BOOKIN data.

ADDITIONAL EMBODIMENTS

Attribution Analysis

The BkYld of a given vintage BOOKIN may change from performance month to performance month. Why is the BkYld changing?

change in MBS prepayment estimates;
impaired credit bonds;
callable bonds being called;
reinvestment of cash flows at significantly different BkYlds;
matured bonds leaving the BOOKIN.

We plan to provide attribution analysis that breaks down the monthly BkYld change into these various components.

We also plan to provide attribution analysis for BkInc:
gain/loss realized
coupon
"truing up" BkYld due to changes to prepayment forecasts
BOOKINs that include municipal securities are included in other embodiments.

After-tax BOOKIN data also may be produced:

Assume, for now, the following insurance company marginal tax rates:
municipal income: 35%×15%=5¼%
capital gains: 35%
ordinary income: 35%
OID (original issue discount) and AMT (alternative minimum tax) tax issues preferably are ignored.

BOOKINs for Custom Indices

Many long-horizon investors follow custom indices (e.g., issuer-capped indices). BOOKINs for such custom indices are provided by other embodiments. Given the description provided herein, those skilled in the art will understand how these other embodiments are to be implemented.

A spreadsheet interface may be used (see FIG. 26). Investors must provide a vector of monthly investment cash flows. This vector is used to weight the various vintage BOOKINs to produce a composite performance benchmark. On the "main" worksheet, the user selects the date of the initial inflow (i.e., initial investment) in the list that starts in cell H1. Then the user enters inflows, including the initial inflow, in the appropriate cells in column C. Then columns D-G give the month-by-month time series of book value, cash flow, book return, and book yield[33] of the fund. It is only necessary to put in column C new money put in the fund—the reinvestment of cashflows is handled automatically.

[33] The book yield reported for a given date is the prospective yield, ie., the book yield of the just-updated portfolio whose cashflows from the previous month have been invested in the coming month's underlying index. Other embodiments also report the "returns" yield, i.e., the book yield as of that date of the portfolio as it was in the beginning of the month. The returns yield should closely match the book return for the past month.

Handling Investment OutFlows

A book-account investor's benchmark is a Composite BOOKIN which is a portfolio of monthly BOOKINs.[34] If there is a single investment inflow, then the Composite BOOKIN is just the monthly BOOKIN corresponding to the month that the inflow occurred.

[34] A monthly BOOKIN (e.g., JAN04 Aggregate BOOKIN) itself is a composite BOOKIN as it includes any subsequent investments in later BOOKINs due to cash flows generated by the initial (and subsequent) JAN04 BOOKINs. For discussion purposes we refer to a monthly BOOKIN (e.g., JAN04) as that portfolio of BOOKINs generated by the initial JAN04 investment and the subsequent BOOKIN investments implied by that initial investment. Composite BOOKINs are portfolios of monthly BOOKINs that are produced due to investment cash flows.

If there are subsequent investment inflows (besides the normal cash flows associated with the initial monthly BOOKIN), then the Composite BOOKIN is a BkValue weighted-composite of the two monthly BOOKINs.

What happens if there is a subsequent investment outflow (i.e., cash is raised from the Composite BOOKIN)? A decision must be made as to which monthly BOOKIN(s) are sold to raise cash. This decision will affect the BkInc, BkRet and BkYld of the Composite BOOKIN going forward.

For example, suppose $100 market value was initially invested in the JAN00BOOKIN with a BkYld of 6% and a BkP of 100. In JAN02, another $100 market value was invested in the JAN02 BOOKIN at a book yield of 7% and a BkP of 95. This implies that $105.2632 par amount was purchased, producing a BkValue of $100. The Composite BOOKIN has a BkYld of 6.5%.

Suppose we are now at the beginning of JAN05 and we assume that the JAN00 BOOKIN's BkValue equals $100 and its BkP equals 100. However, its MkP has dropped to 97. Further, suppose in JAN05, the BkP for the JAN02 BOOKIN is 96 and its BkValue is $101.0526 and its MkP is 94. [Also, for simplicity, we are ignoring any coupon cash flows arising from each monthly BOOKIN.] The BkYld for the Composite BOOKIN is now 6.5026% and its book value is $201.05. See FIGS. 27 and 28.

In JAN05, the investor is told that $50.00 in cash must be raised from the portfolio. After raising the cash, what will be the book yield on the Composite BOOKIN for JAN05? How much gain or loss will be recognized? [Note: Book gains/losses are measured by the difference between the Market Value and the BkValue.] What will be the Composite BOOKIN's BkRet for JAN05? The answer to these questions will depend on which monthly BOOKINs are sold from the Composite BOOKIN to raise $50.00. Consider the following example:

To raise $50.00 in cash suppose the user decides to sell the JAN00 BOOKIN. To raise $50.00, the investor will have to sell $51.5464 par value of the bonds at a market price of 95 ($51.5464×0.97=$50.00).

This produces a book loss of $51.5464×[97(MktP)−100 (BkP)]=−$1.546392. This book loss will become part of the BkRet for JAN05.

What happens to BkYield? The user's book-account index now contains the following as of JAN05:

TABLE 2

Monthly BOOKIN Data (after sale of JANUARY 2000 BOOKIN)

|  | JANUARY 2000 Monthly BOOKIN | JANUARY 2002 Monthly BOOKIN |
|---|---|---|
| month | JANUARY 2005 | JANUARY 2005 |
| $MkP | 97 | 94 |
| ParAmt | 48.4536 | 100 |
| $MkValue | $47 | $94 |
| BkP | 100 | 96 |
| BkValue | $48.4536 | $101.05 |
| BkYld | 6% | 7% |
| $MtValue/BkValue | 0.97 | 0.9716 |

TABLE 3

Composite BOOKIN Data (after sale of portion of JANUARY 2000 BOOKIN) As of JANUARY 2005

| BkValue Weights | | | |
|---|---|---|---|
| JANUARY 2000 | JANUARY 2002 | BkYld | BkValue |
| 0.3241 | 0.6759 | 6.6759% | $149.5036 |

So, the investor's Composite BOOKIN has a $$\text{JANUARY2005 } BkP = (0.3241) \times 100 + (0.6759) \times 96$$
$$= 97.2964$$

$$\text{JANUARY2005 } BkYld = (0.3241) \times 6.0\% + (0.6759) \times 7.0\%$$
$$= 6.6759\%$$

By recognizing losses this period (i.e., selling the BOOKIN with a MkValue/BkValue ratio that is <1 and with the lower yield), the user is able to raise the BkYld on the book-accounting index.[35]

[35] Conversely, if the user wanted to recognize a gain this period (i.e., selling the BOOKIN with a MktValue/BkValue>1), the BkYld would have declined.

Generally, when assets are sold the manager is asked to accomplish some other goal besides just raising cash:

For example:

1. Raise cash and find $X in book losses
2. Raise cash and find $Y in book gains
3. Raise cash but be book gain/loss neutral (or, generate cash by finding the MIN[|gain|, |loss|]
4. Raise cash and find the greatest increase in BkYield When there are investment outflows from the manager's portfolio, the BOOKIN Methodology must have the flexibility to adjust the composition of the manager's BOOKIN to reflect the manager's investment constraints.

For manageability, the BOOKIN Methodology for handling investment outflows makes the following assumptions:

A. When a portion of a monthly BOOKIN is sold, the sale is pro rata across all the bonds in the monthly BOOKIN. In other words, individual bonds cannot be sold—only a portion of the entire monthly BOOKIN.

B. A monthly BOOKIN is treated as a single entity. For example, by DEC04, a JAN04 BOOKIN will include investments in subsequent BOOKINs due to cash flow generated by the initial investment in the JAN04 Index. However, when deciding on which monthly BOOKINs to sell out of the Composite BOOKIN, we do not disaggregate the JAN04 BOOKIN into its initial investment and its much smaller subsequent investments.

The preferred BOOKIN methodology offers the following investor options to handle investment outflows:

1. Raise $C in Cash: Use Pro-Rata Across All Monthly BOOKINs

If cash must be raised, the sales of the monthly BOOKINs comprising the investor's composite BOOKIN will be pro-rata across all the monthly BOOKINs. The BkValue of each monthly BOOKIN in the Composite BOOKIN will be used as weights.

2. Raise $C in Cash & Maximize Losses

If cash must be raised and losses are desired, sales of monthly BOOKINs will be made according to their MkValue/BkValue ratios. To recognize a loss, the investor will sell (if possible) only BOOKINs whose MkValue/BkValue ratio is <1.0.

First, all the monthly BOOKINs in the investor's Composite BOOKIN are sorted in ascending order of their MkValue/BkValue ratios. The first monthly BOOKIN sold will be the one with the lowest ratio. If this does not generate sufficient cash, then the monthly BOOKIN with the next lowest ratio will be sold, and so on.

3. Take $X Losses & Maximize the New Composite BOOKIN BkYld. Amount of $C Raised is Not Relevant.

If $X losses must be generated, sales of monthly BOOKINs will be made according to their MkValue/BkValue ratio and BkYlds. First, all the monthly BOOKINs in the investor's Composite BOOKIN are sorted in ascending order of their MkValue/BkValue ratios. To recognize a loss, the investor will sell (if possible) only BOOKINs whose MkValue/BkValue ratio is <1.0.

Monthly BOOKINs with a MkValue/BkValue ratio <1.0 are then sorted according to their BkYld. The first monthly BOOKIN sold will be the one with the lowest BkYld. If this does not generate sufficient losses, then the monthly BOOKIN with the next BkYld will be sold, and so on.

4. Raise $C in Cash & Maximize Gains

If cash must be raised and losses are desired, sales of monthly BOOKINs will be made according to their MkValue/BkValue ratios. To recognize a gain, the investor will only sell (if possible) BOOKINs whose MkValue/BkValue ratio is >1.0. First, all the monthly BOOKINs in the investor's Composite BOOKIN are sorted in descending order of their MkValue/BkValue ratios. The first monthly BOOKIN sold will be the one with the highest ratio. If this does not generate sufficient cash, then the monthly BOOKIN with the next highest ratio will be sold, and so on.

5. Recognize $Y Gains & Maximize the New Composite BOOKIN BkYld. Amount of $C Raised is Not Relevant.

If $Y gains must be recognized, sales of monthly BOOKINs will be made according to their MkValue/BkValue ratio and BkYlds. First, all the monthly BOOKINs in the investor's Composite BOOKIN are sorted in descending order of their MkValue/BkValue ratio. To recognize a gain, the investor will sell (if possible) only BOOKINs whose MkValue/BkValue ratio is >1.0.

Monthly BOOKINs with a MkValue/BkValue ratio >1.0 are then sorted according to their BkYld. The first monthly BOOKIN sold will be the one with the lowest BkYld. If this does not generate sufficient gains, then the monthly BOOKIN with the next BkYld will be sold, and so on.

6. Minimize Absolute Value of Any Net Gain/Loss (Harvest Gains/Losses) "Sell the Wings"

If cash must be raised, but sales must minimize the possibility of any gain/loss (i.e., preferably be gain/loss neutral), then sales of monthly BOOKINs will be made by pairing monthly BOOKINs with high and low MkValue/BkValue ratios. First the monthly BOOKINs with the lowest and highest MkValue/BkValue ratio are sold. If this does not generate sufficient cash, but the action produces a net loss (gain) then the monthly BOOKINs with the next highest (lowest) MkValue/BkValue ratio is sold, and so on.

7. Minimize Absolute Value of Any Net Gain/Loss (Minimize Harvesting of any Gains/Losses) "Hold the Wings"

If cash must be raised, but sales must minimize the possibility of any gain/loss (i.e., preferably be gain/loss neutral), then sales of monthly BOOKINs will be made first selling the monthly BOOKINs with the MkValue/BkValue ratio closest to 1.0. If this does not generate sufficient cash, but the action produces a net loss (gain) then the monthly BOOKINs whose MkValue/BkValue ratio is closest to 1.0 from above (below) is sold, and so on.

Since only BOOKINs with a MkValue/BkValue ratio close to 1.0 are sold, this will tend to reduce any change in the new Composite BOOKIN BkYld.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

For example, all calculations preferably are performed by one or more computers. Moreover, all notifications and other communications, as well as all data transfers, to the extent allowed by law, preferably are transmitted electronically over a computer network. Further, all data preferably is stored in one or more electronic databases.

In general, although particular embodiments of the invention have been described in detail for the purpose of illustration, it is to be understood that such detail is solely for that purpose and that variations can be made thereof by those skilled in the art without departing from the scope of the invention, which should be determined exclusively from the plain wording of the appended claims. Any details in the specification that are not included in the claims themselves should not be construed as limiting the scope of the invention.

We claim:

1. A system comprising:

memory operable to store at least one program; and at least one processor communicatively coupled to the memory, in which the at least one program, when executed by the at least one processor, causes the at least one processor to:

access and process data regarding a first portfolio of securities identified as corresponding, at a specified time, to an index;

calculate, for said first portfolio, a first set of performance values comprising one or more of: book yield, book income, and book return;

calculate, for a second portfolio of securities, a second set of performance values corresponding to said first set of performance values; and compare said second set of performance values to said first set of performance values to obtain a performance measure for said second portfolio.

2. A system as in claim 1, wherein said first and second sets of performance values comprise book yield, book income, and book return.

3. A system as in claim 1, wherein said securities are bonds.

4. A system as in claim 1, wherein said index is a custom index.

5. A system as in claim 1, wherein said first portfolio is managed according to a passive investment strategy.

6. A system as in claim 5, wherein said passive investment strategy comprises a buy and hold strategy.

7. A system as in claim 5, wherein said passive investment strategy comprises a modified buy and hold strategy.

8. A system as in claim 5, wherein said passive investment strategy comprises a strategy of continually matching said index.

9. A system as in claim 5, wherein said passive investment strategy comprises a strategy of tracking an external target variable.

10. A system as in claim 5, wherein said passive investment strategy comprises replicating cash outflows from said second portfolio in said first portfolio by implementing corresponding cash outflow instructions.

11. A system as in claim 1, wherein said first portfolio follows book accounting principles analogous to book accounting principles followed by said second portfolio.

12. A system as in claim 1, wherein said securities comprise bonds, and wherein each bond's book yield equals said bond's bond-equivalent yield at time of purchase.

13. A system as in claim 1, wherein said securities comprise bonds, and wherein each bond's book value equals said bond's market price at time of purchase.

14. A system as in claim 1, wherein said securities comprise bonds, and wherein each bond's book return equals said bond's book income for a specified performance month divided by said bond's book value at the beginning of said specified performance month.

15. A system as in claim 1, wherein said securities comprise bonds, and wherein each bond's book income equals said bond's book yield for a specified performance month multiplied by said bond's book value for the month immediately preceding said specified month, plus any necessary adjustments to said book income for said month immediately preceding said specified month, plus any final adjustments to said bond's final book value.

16. A system as in claim 1, wherein said securities comprise one or more prepaying securities.

17. A system as in claim 16, wherein for each of one or more of said prepaying securities, book yield is calculated using a prepayment vector.

18. A system as in claim 17, wherein book yield is recalculated when actual prepayment experience or forecast of prepayments going forward differs from what was assumed in an initial month.

19. A system as in claim 1, wherein said securities comprise one or more impaired credit bonds.

20. A system as in claim 19, wherein each of one or more of said impaired credit bonds is assumed to be sold from said first portfolio at the end of a month in which said impaired credit bond is impaired.

21. A system as in claim 1, wherein a cash flow generated by said first portfolio is re-invested in a portfolio corresponding to said index within two months of generation of said cash flow.

22. A system as in claim 21, wherein said processor is further caused to compare said second set of performance values to said first set of performance values and performance values for each portfolio corresponding to a cash flow.

23. A method comprising:
reviewing a performance measure calculated by a computer based on a comparison of a first set of performance values for a first portfolio of securities and a second set of performance values for a second portfolio of securities,
wherein said first portfolio of securities corresponds, at a specified time, to an index;
wherein said first set of performance values comprise one or more of: book yield, book income, and book return; and
wherein said second set of performance values corresponds to said first set of performance values.

24. A method comprising:
accessing via a computer network a performance measure based on a comparison of a first set of performance values for a first portfolio of securities and a second set of performance values for a second portfolio of securities,
wherein said first portfolio of securities corresponds, at a specified time, to an index;
wherein said first set of performance values comprise one or more of: book yield, book income, and book return; and
wherein said second set of performance values corresponds to said first set of performance values.

* * * * *